United States Patent
Lashkari et al.

(10) Patent No.: US 9,990,689 B2
(45) Date of Patent: Jun. 5, 2018

(54) MULTI-USER VIRTUAL REALITY PROCESSING

(71) Applicant: WorldViz, Inc., Santa Barbara, CA (US)

(72) Inventors: Farshid Lashkari, Santa Barbara, CA (US); Andrew C. Beall, Santa Barbara, CA (US)

(73) Assignee: WorldViz, Inc., Santa Barbara, CA (US)

( * ) Notice: Subject to any disclaimer, the term of this patent is extended or adjusted under 35 U.S.C. 154(b) by 19 days.

(21) Appl. No.: 14/971,720

(22) Filed: Dec. 16, 2015

(65) Prior Publication Data

US 2017/0178272 A1    Jun. 22, 2017

(51) Int. Cl.
| | |
|---|---|
| *G06T 1/20* | (2006.01) |
| *G06T 19/00* | (2011.01) |
| *G02B 27/01* | (2006.01) |
| *G02B 27/00* | (2006.01) |

(52) U.S. Cl.
CPC ............ *G06T 1/20* (2013.01); *G02B 27/0093* (2013.01); *G02B 27/0172* (2013.01); *G06T 19/006* (2013.01); *G02B 2027/014* (2013.01)

(58) Field of Classification Search
CPC ..... G06T 1/20; G06T 19/006; G02B 27/0093; G02B 27/0172; G02B 2027/014
USPC .................................................. 345/633, 504
See application file for complete search history.

(56) References Cited

U.S. PATENT DOCUMENTS

| | | |
|---|---|---|
| 6,574,352 B1 | 6/2003 | Skolmoski |
| 6,720,949 B1 | 4/2004 | Pryor et al. |
| 7,719,484 B2 | 5/2010 | Turner et al. |
| 8,472,120 B2 | 6/2013 | Border et al. |
| 8,482,859 B2 | 7/2013 | Border et al. |
| 8,570,378 B2 | 10/2013 | Zalewski et al. |
| 9,110,503 B2 | 8/2015 | Beall et al. |
| 2002/0036617 A1 | 3/2002 | Pryor |
| 2010/0311512 A1 | 12/2010 | Lock et al. |
| 2012/0156652 A1 | 6/2012 | Lane |
| 2012/0178054 A1 | 7/2012 | Jomander et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |
| 2012/0194551 A1 | 8/2012 | Osterhout et al. |
| 2012/0194552 A1 | 8/2012 | Osterhout et al. |
| 2012/0200601 A1 | 8/2012 | Osterhout et al. |

(Continued)

OTHER PUBLICATIONS

U.S. Appl. No. 14/937,400, filed Nov. 10, 2015, Pusch et al.

(Continued)

*Primary Examiner* — Ke Xiao
*Assistant Examiner* — Kim-Thanh T Tran
(74) *Attorney, Agent, or Firm* — Knobbe, Martens, Olson & Bear LLP

(57) ABSTRACT

A multi-user virtual reality and/or augmented reality cluster system enabling the projection and tracking of users in a simulated environment is described. The disclosed cluster system enables both timely user action display in the first person and a timely view of a user's action by other participants of the simulation. The cluster system integrates motion capture cameras, distributed computing, and tracking devices to provide a simulation which seems lifelike to all participants and observers.

22 Claims, 6 Drawing Sheets

(56) References Cited

U.S. PATENT DOCUMENTS

| | | | |
|---|---|---|---|
| 2012/0206334 A1 | 8/2012 | Osterhout et al. | |
| 2012/0212406 A1 | 8/2012 | Osterhout et al. | |
| 2012/0212499 A1 | 8/2012 | Haddick et al. | |
| 2014/0152550 A1* | 6/2014 | Beall | G06F 3/012 345/156 |
| 2014/0361956 A1* | 12/2014 | Mikhailov | H04N 13/0271 345/8 |
| 2015/0235434 A1* | 8/2015 | Miller | G06T 19/006 345/633 |
| 2015/0346327 A1 | 12/2015 | Beall et al. | |
| 2016/0129346 A1 | 5/2016 | Mikhailov | |
| 2016/0266644 A1 | 9/2016 | Yamamoto | |

OTHER PUBLICATIONS

Ambisonic 3D Auralizer System, WorldViz, LLC, 2 pages, Sep. 27, 2014, https://web.archive.org/web/20140927060932/http:/www.worldviz.com/products/ambisonic.

Augmented Reality, WorldViz, LLC, 3 pages, Sep. 27, 2014, https://web.archive.org/web/20140927061320/http:/www.worldviz.com/products/augmented-reality.

Head Mounted Displays, WorldViz, LLC, 2 pages, Sep. 26, 2014 https://web.archive.org/web/20140926011241/http://www.worldviz.com/products/head-mounted-displays.

Motion Tracking, World Viz, 4 pages, 2012.

Other VR Hardware, WorldViz, LLC, 15 pages, Sep. 27, 2014, https://web.archive.org/web/20140927061334/http://www.worldviz.com/products/other-vr-hardware.

Precision Position Tracking for Virtual Reality, WorldViz, LLC, 2 pages, Oct. 24, 2014, https://web.archive.org/web/20141024142530/http:/www.worldviz.com/products/ppt.

"The WorldViz wireless 6Dof Wand controller is used to navigate in and interact within the 3D model," architecture interactive, 2 pages, 2012.

Vizard Virtual Reality Software Toolkit, 2 pages, Sep. 26, 2014, https://web.archive.org/web/20140924064245/http:/www.worldviz.com/products/vizard.

* cited by examiner

MULTI-USER VIRTUAL REALITY PROCESSING

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

FIELD OF THE INVENTION

The present invention relates to systems and methods for enabling a multi-user virtual reality and/or augmented reality experience.

BACKGROUND

Virtual Reality (VR) comprises a computer simulated environment that can simulate a physical presence in places in the real world or imagined worlds. Conventionally, virtual reality environments are primarily visual experiences, displayed on a screen (e.g., and viewed by a user using 3D glasses) or through special stereoscopic display head gear. The simulated environments can be similar to the real world in order to create lifelike experiences or it differs significantly from reality, such as in VR games.

Augmented Reality (AR) generally refers to a computer simulated environment combined with the real world. Conventionally, the elements of the real world are augmented with computer generated graphics. Often, translucent stereoscopic headsets are worn by the user in AR simulations to enable a wearer to view the real world through the headset while also being able to view computer generated graphics.

Multi-user environments greatly expands the potential of virtual environments by allowing users to inhabit the same virtual world. As such, people can socialize, negotiate, play games, work together or otherwise interact in an entirely digital context. Moreover, a user can be in a completely different part of the planet and still experience the "physical" presence of another participant.

SUMMARY

An aspect of the disclosure relates to an example cluster computing system configured to interface and work in conjunction with a tracking system, to provide a high quality multi-user, virtual and/or augmented reality experience, with significantly reduced human-perceptible latencies. Optionally, the example cluster computing system further enables content providers to create single-user virtual and/or augmented reality experiences, where the cluster computing system extends the single-user virtual and/or augmented reality experience via a cooperative distributed and centralized computing architecture to a multi-user virtual and/or augmented reality experience (e.g., by having a master server generating and enabling the of rendering the different viewpoints for each client in a multi-user VR simulation the clients. Optionally, the cluster computing system further manages via abstraction the intricacies of interworking in a multi-user environment with various hardware components from various hardware manufacturers.

DETAILED DESCRIPTION

Figure 1:
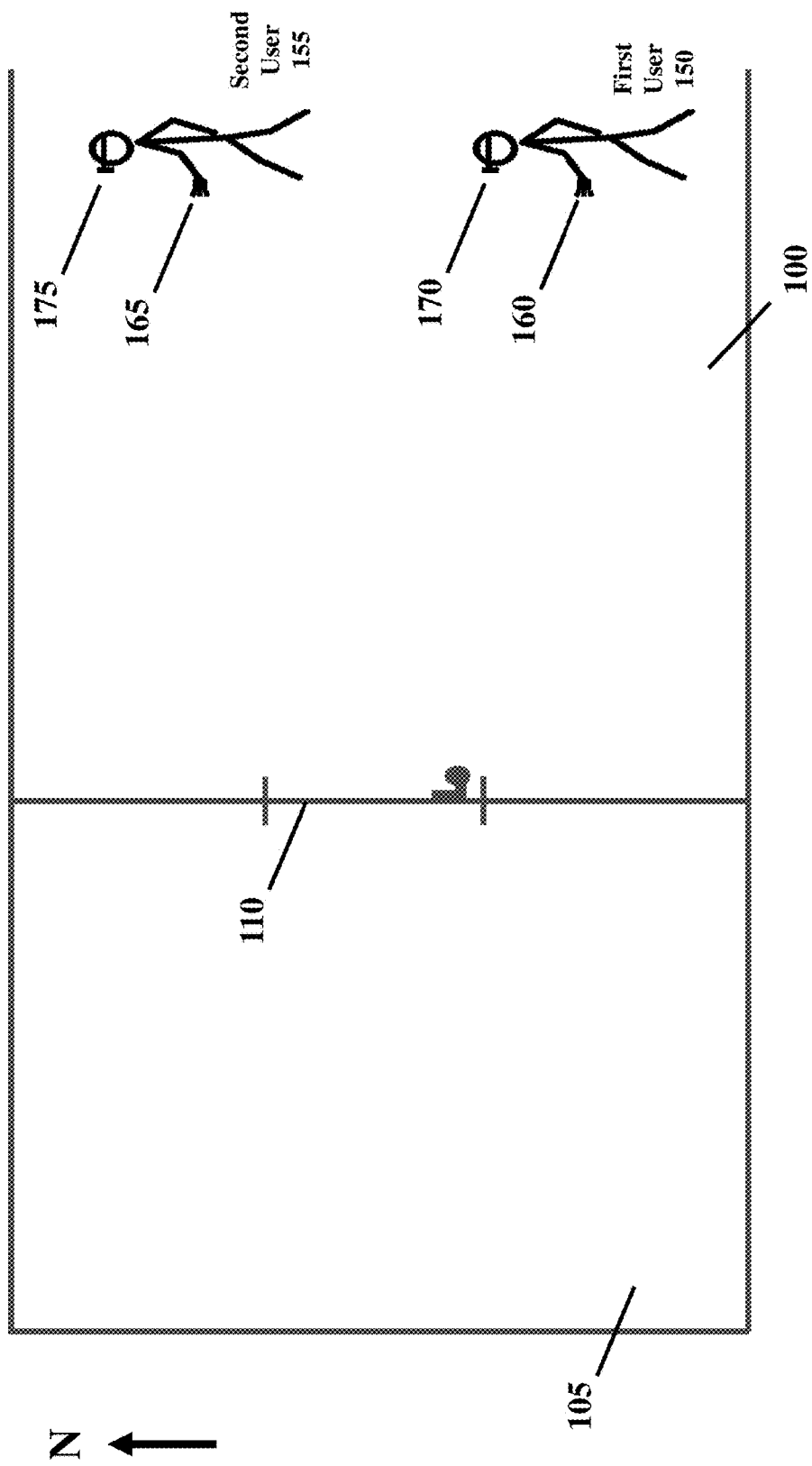
FIG. 1 illustrates an example embodiment of a virtual reality scenario.

An aspect of this disclosure relates generally to devices and methods for enabling a multi-user virtual or augmented reality experience, and in particular, to a cluster computing system which works in conjunction with a motion capture tracking element.

Advantageously, virtual reality and/or simulated environments as described herein can be used in a number of application areas including but not limited to: real estate, architecture, product design, human behavior analysis, user training, gaming, product and marketing evaluation, design verification, data visualization, teleoperation, and telepresence or any physical environment that for reasons of, for example, cost or potential harm to a user can be simulated rather than directly experienced. In addition, virtual reality as described herein may also be used in augmented reality environments, including for example, in an automotive augmented reality environment.

Conventionally, VR and AR environments have been oriented to a single-user environment. Recently, multi-user VR environments/worlds have been created which enable users to collaborate and share a virtual world experience. A number of technical challenges arise in the implementation of a multi-user VR environments. Generally, users are on separate computing platforms connected by a Local-Area-Network or in some cases a Wide-Area-Network (e.g., if the VR participants are geographical separated) and these networks are subject to inherent communication delays, which may result in an unrealistic simulation of views and actions. Another key challenge of multi-user VR systems is the timely synchronization and rendering of a VR participant's action from the viewpoint (e.g., correct perspective) of each participant in the simulation. Further, each VR participant may be configured with different hardware including but not limited to different: computing platforms, displays, trackers, and input devices. Thus, there is a need to enable a dynamic and real-time (or near real-time) immersive, multi-user virtual reality environment in which user actions and scenes are synchronized across varying hardware devices with minimal programmatic and configuration effort on the part of virtual reality content creators. Advantageously, embodiments of the virtual/augmented reality cluster system achieve some or all these objectives via a client-server architecture which enables certain client contextual processing and certain centralized server processing and synchronization control in order to provide a multi-user virtual user experience which seems lifelike to all participants of the simulation.

Aspects of the disclosure relates to an example cluster computing system configured to interface and work in conjunction with a tracking system, to provide a high quality multi-user, lifelike, virtual and/or augmented reality experience, with significantly reduced human-perceptible latencies. Thus, aspects of the disclosure herein relate to a multi-user VR/AR environment that may be configured to enable both timely user actions in a display in the first person (that is, the system's rendering of a user action in the viewpoint of the user, optionally, on a computing device local and/or associated with a user) and the view of a user's action by other participants of the simulation (optionally, rendered on a computing device local and/or associated with a user). Aspects of the disclosure further relate to systems and processes that provide timely synchronization (for example, via a master computing device) and an enabled rendering of a VR participant's action from the viewpoint (e.g., the correct perspective) of each participant in the simulation. Further, aspects of the disclosure relate to systems and processes that provide a dynamic and real-time (or near real-time) immersive, multi-user virtual reality environment in which user actions and scenes are synchronized across varying hardware devices, optionally with minimal programmatic and configuration effort on the part of virtual reality content creators/operators/participants.

A given embodiment may include some or all of the features, functionality, systems and methods described herein.

An example embodiment provides a cluster system, comprising: a master computing device; a first computing device configured as a first client computing device, the first client computing device associated with a first user; a second computing device configured as a second client computing device, the second client computing device associated with a second user; a plurality of motion tracking cameras, wherein the plurality of motion tracking cameras are configured to reside in a physical space coincident with the first user, the plurality of motion tracking cameras configured to detect infrared light and to communicate position data derived from detected infrared light to the first computing device and to the master computing device; a first marker, attachable to a head mounted display associated with the first user, the first marker configured to emit a first repetitive pattern of infrared light pulses, the first marker associated with one or more privileged operations that are to be performed locally by the first computing device; a second marker, attachable to the head mounted display associated with the first user, the second marker configured to emit a second repetitive pattern of infrared light pulses distinct from the first repetitive pattern of infrared light pulses, the second marker associated with one or more privileged operations that are to be performed locally by the first computing device; a third marker, wearable or holdable by the first user, the third marker configured to emit a third repetitive pattern of infrared light pulses distinct from the first repetitive pattern of infrared light pulses and distinct from the second repetitive pattern of infrared light pulses, wherein the third marker is associated with one or more non-privileged operations that are to be performed remotely by the master computing device; non-transitory media that stores instructions readable by the cluster system, that when executed by the cluster system, cause the cluster system to: access configuration information comprising information indicating what types of operations are privileged and what types of operations are non-privileged; receive, at the first computing device from one or more of the plurality of motion tracking cameras, position data corresponding to the first marker and position data corresponding to the second marker; at least partly in response to the receipt by the first computing device of the position data corresponding to the first marker and the position data corresponding to the second marker and on the accessed configuration information, determine that a privileged operation is to be performed by the first computing device and not by the master computing device, the privileged operation enabling an orientation of a first scene of a simulation to be rendered in the head mounted display associated with the first user in synchronization with movement of the head mounted display in at least five degrees of freedom; transmit, from the first computing device to the master computing device, a position of the first user in the physical space and provide a first instruction by the master computing device enabling an image corresponding to the first user to be rendered at a first virtual position in a display device associated with the second user, wherein the first virtual position is based at least in part on the position of the first user in the physical space and on a viewpoint of the second user; receive, at the master computing device from one or more of the plurality of motion tracking cameras, position data corresponding to the third marker; and at least partly in response to receipt of the position data corresponding to the third marker and on the accessed configuration information, determine that a non-privileged operation is to be performed by the master computing device and not by the first computing device, wherein the non-privileged operation comprises enabling: synchronized movement of a virtual representation of the third marker from a viewpoint of the first user corresponding to received position changes associated with the third marker to be rendered in the head mounted display associated with the first user and synchronized movement of a virtual representation of the third marker from a viewpoint of the second user corresponding to received position changes associated with the third marker to be rendered in the head mounted display associated with the second user; and, optionally wherein the plurality of motion tracking cameras are configured to detect infrared light and to communicate position data derived from detected infrared light to the second computing device; and, optionally wherein the third marker is attached to a limb of the first user; and, optionally wherein the third marker is attached to or included as a component of a handheld tracking device; and, optionally wherein the first repetitive pattern of infrared light pulses comprise light intensity state transitions; and, optionally wherein the plurality of motion tracking cameras are configured to derive the identity of a marker from a detected repetitive pattern of infrared light pulses; and, optionally wherein the cluster system is configured to enable, via a user interface of the master computing device, a third user to indicate what types of operations are privileged and what types of operations are non-privileged; and, optionally wherein the virtual marker representation of the third marker comprises a virtual representation of a glove.

An example embodiment provides a cluster system, comprising: a master computing device; a plurality of motion tracking cameras, wherein the plurality of motion tracking cameras configured to reside in a physical space coincident with the first user, the plurality of motion tracking cameras configured to detect infrared light and to communicate position data derived from detected infrared light to the master computing device; a marker, wearable or holdable by the first user, configured to emit a repetitive pattern of infrared light pulses, wherein the marker is associated with one or more non-privileged operations that are to be performed remotely by the master computing device; non-transitory media storing instructions readable by the cluster system, that when executed by the cluster system, cause the cluster system to: access configuration information comprising information indicating what types of operations are privileged and what types of operations are non-privileged; receive at the master computing device, a position of the first user in the physical space and provide a first instruction by the master computing device enabling an image corresponding to the first user to be rendered at a first virtual position in a display device associated with a second user, wherein the first virtual position is based at least in part on the position of the first user in the physical space and on a viewpoint of the second user; receive, at the master computing device, from one or more of the plurality of motion tracking cameras, position data corresponding to the marker; and at least partly in response to the receipt of the position of the marker and on the accessed configuration information, determine that a non-privileged operation is to be performed by the master computing device and not by another computing device associated with the cluster system, wherein the non-privileged operation comprises enabling: synchronized movement of a virtual representation of the marker from a viewpoint of the first user corresponding to received position changes associated with the marker to be rendered in the head mounted display associated with the first user and synchronized movement of the virtual representation of the marker from a viewpoint of the second user corresponding to received position changes associated with the third marker to be rendered in the head mounted display associated with the second user; and, optionally wherein the marker is configured to be attached to a limb of the first user; and, optionally wherein the marker is attached to or included as a component of a handheld tracking device; and, optionally wherein the first repetitive pattern of infrared light pulses comprise light intensity state transitions; and, optionally wherein the plurality of motion tracking cameras are configured to derive the identity of a marker from a detected repetitive pattern of infrared light pulses; and, optionally wherein the cluster system is configured to enable, via a third user interface of the master computing device, a user to indicate what types of operations are privileged and what types of operations are non-privileged.

An example embodiment provides a cluster system, comprising: a first computing device configured as a first client computing device, the first client computing device associated with a first user; a second computing device configured as a second client computing device, the second client computing device associated with a second user; a plurality of motion tracking cameras, wherein the plurality of motion tracking cameras are configured to reside in a physical space coincident with the first user, the plurality of motion tracking cameras configured to detect infrared light and to communicate position data derived from detected infrared light to the first computing device; a first marker, attachable to a head mounted display associated with the first user, the first marker configured to emit a first repetitive pattern of infrared light pulses, the first marker associated with one or more privileged operations that are to be performed locally by the first computing device; a second marker, attachable to the head mounted display associated with the first user, the second marker configured to emit a second repetitive pattern of infrared light pulses distinct from the first repetitive pattern of infrared light pulses, the second marker associated with one or more privileged operations that are to be performed locally by the first computing device; a third marker, wearable or holdable by the first user, the third marker configured to emit a third repetitive pattern of infrared light pulses distinct from the first repetitive pattern of infrared light pulses and distinct from the second repetitive pattern of infrared light pulses, wherein the third marker is associated with one or more non-privileged operations that are to be performed remotely by a computing device other than the first computing device; non-transitory media that stores instructions readable by the cluster system, that when executed by the cluster system, cause the cluster system to: access configuration information comprising information indicating what types of operations are privileged and what types of operations are non-privileged; receive, at the first computing device from one or more of the plurality of motion tracking cameras, position data corresponding to the first marker and position data corresponding to the second marker; at least partly in response to the receipt by the first computing device of the position data corresponding to the first marker and the position data corresponding to the second marker and on the accessed configuration information, determine that a privileged operation is to be performed locally by the first computing device and not by a computing device other than the first computing device, the privileged operation enabling an orientation of a first scene of a simulation to be rendered in the head mounted display associated with the first user in synchronization with movement of the head mounted display in at least five degrees of freedom; transmit, from the first computing device to a master computing device, a position of the first user in the physical space; receive, at the second computing device, a first instruction enabling: an image corresponding to the first user to be rendered at a first virtual position in a display device associated with the second user, wherein first virtual position is based at least in part on the position of the first user in the physical space and on a viewpoint of the second user; receive, at the first computing device, a first non-privileged instruction enabling: synchronized movement of a virtual representation of the third marker from a viewpoint of the first user corresponding to received position changes associated with the third marker to be rendered in the head mounted display associated with the first user; and receive, at the second computing device, a second non-privileged instruction enabling: synchronized movement of a virtual representation of the third marker from a viewpoint of the second user corresponding to received position changes associated with the third marker to be rendered in the head mounted display associated with the second user; and, optionally wherein the plurality of motion tracking cameras are configured to detect infrared light and to communicate position data derived from detected infrared light to the second computing device; and, optionally wherein the plurality of motion tracking cameras are configured to detect infrared light and to communicate position data derived from detected infrared light to a computing device other than the first computing device or the second computing device; and, optionally wherein the third marker is configured to be attached to a limb of the first user; and, optionally wherein the third marker is attached to or included as a component of a handheld tracking device; and, optionally wherein the at least five degrees of freedom comprise X-axis, Y-axis, Z-axis, yaw, and roll; and, optionally wherein the first repetitive pattern of infrared light pulses comprise light intensity state transitions; and, optionally wherein the plurality of motion tracking cameras are configured to derive the identity of a marker from a detected repetitive pattern of infrared light pulses.

Example features will now be described with reference to the figures.

Figure 2:
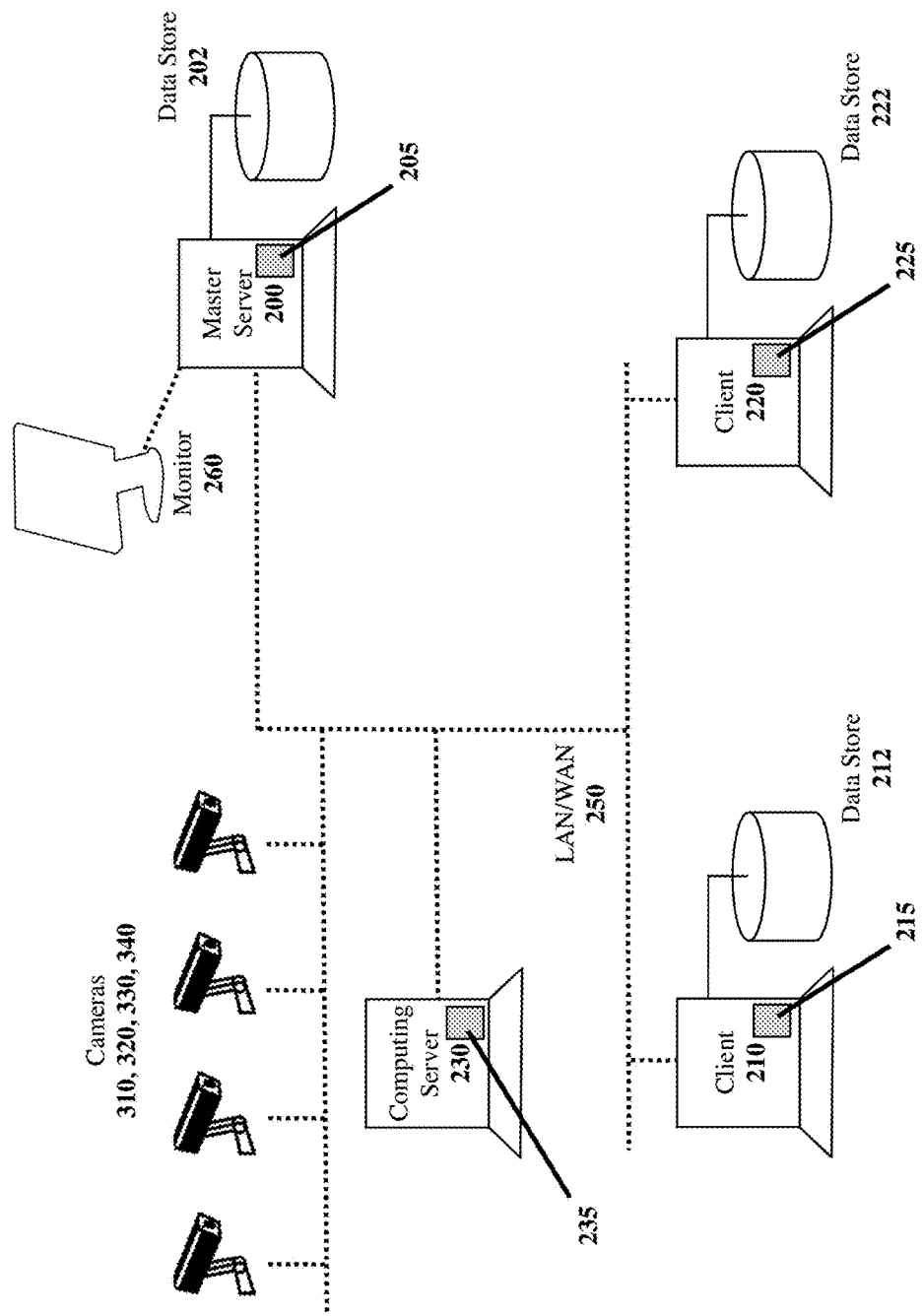
FIG. 2 illustrates an example operating environment of a clustered system with a master server and multiple clients.

FIG. 2 illustrates an example system architecture. As described herein, the illustrated system architecture can be used to facilitate a virtual and/or augmented reality experience, and in particular, a multi-user virtual and/or augmented reality experience. The system may be configured to perform some or all of the following: image capture and tracking functions, video/image processing, marker identification (e.g., LED marker identification), user/object position calculations, action synchronization, and/or dynamic rendering of virtual worlds in an optimized (e.g., in substantially real-time and/or minimal rendering delays) manner to create a lifelike experience. For clarity, the description herein may refer to virtual reality, which is intended to encompass both virtual reality and augmented reality, unless the context indicates otherwise.

As illustrated in FIG. 2, a master server computing device 200 (e.g., a general purpose computer, a tablet computer, a cloud-based server, a smart phone, a graphics processing unit, etc.) is coupled to a plurality of client computing devices 210, 220 over a data network 250 (e.g., a local area network, a wide-area network, the Internet, a private network, a public network, etc.). Optionally, the master server 200 may be directly connected to a console/monitor 260 (or over the data network 250 to a console/monitor 260) which displays a user interface via master server software 200 for a user/participant or operator to provision, designate, and/or configure the master server 200 (e.g., download and/or upgrade software, provision data communication interfaces, configure accounts, administer security, edit files, etc.). Optionally, the master server 200 also provides a computing platform for compiling and/or executing certain programs and/or programmatic scripts (e.g., simulations), receiving and sending certain communications, performing video/image processing tasks, performing math computations, displaying/rendering certain images (e.g., rendering virtual worlds), providing client synchronization, hosting a client application, etc.

Figure 6:
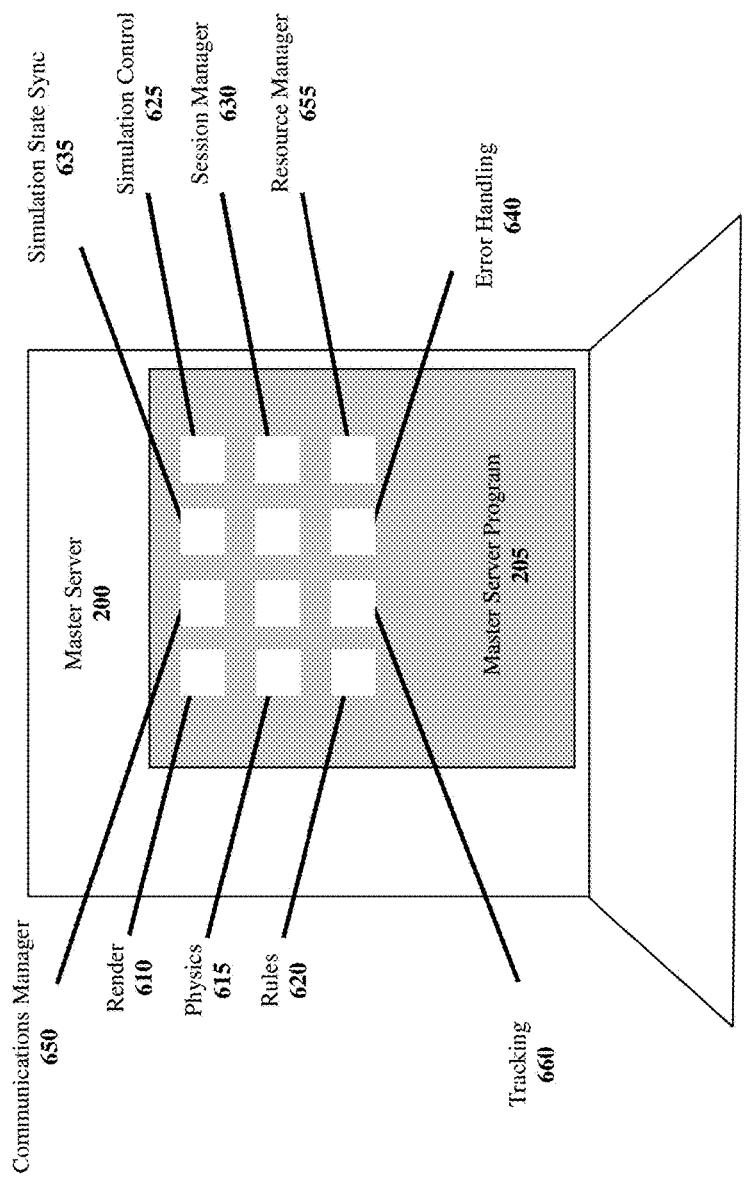
FIG. 6 illustrates an example configuration of software modules of a clustered system.

A given computing device 200, 210, and 220 may be further configured with a data store 202, 212, and 222, respectively, enabling the server to store in memory data associated with the VR session, simulations, models, objects, images, certain parameters, executable scripts/code, local event logs, error logs, etc. Thus, for example, the master server computing device 200 may host a master server software program 205, as illustrated in FIG. 6, comprising a single software program or a plurality of software programs or software modules including, for example, a render engine 610 configured to render and/or enable the rendering of VR scenes, a physics engine 615 (e.g., that provides a simulation of physical systems, such as rigid and soft body dynamics, collision detection, and fluid dynamics, and that provides an interface that hides the low-level details of the physics needed in virtual reality applications to enable application/game developers to focus on the higher-level functionalities of the application), a rules engine 620, a simulation control engine 625 (that coordinates simulation execution), a session manager 630, a simulation state synchronizer engine 635 (that, for example, synchronizes associated client viewpoints) and/or an error handling 640, a client-server communications manager 650 (that, for example, manages client server communications including over a data communication network (e.g., a low latency data communication network)), resource manager 655 (that, for example, manages resources, including shared resources (e.g., simulation objects, scenes, etc.), virtual reality tracking and marker identification software 660 (e.g., the Vizard VR™ toolkit and PPT Studio software from WorldViz LLC of Santa Barbara) by way of example.

The master server computing device 200 may include cluster nodes (e.g., companion computing devices) that handle gameplay/simulation logic, tracking software, and one or more additional servers that process communications from client computing device. The master server computing device 200 may include a login server, including a client/user identity and access authentication engine, that manages login sessions with client computing devices, validates client computing devices (e.g., by checking password and device identifiers), and if the client computing devices are validated, enables the devices to access the master computing device 200 and/or cluster nodes. The data store 202 associated with the master server computing device 200 may store user account information such as password information, user/device identifiers, status of game/simulation play which may be stored upon a user suspending a game/simulation or other virtual/augmented reality activity and which may be accessed and utilized when the activity is restarted to provide a continuous experience, user usage information (e.g., time and duration of virtual/augmented reality activity), other users the user may be linked to (e.g., other users the user has interacted with when engaging in virtual/augmented reality activities), etc.

The master server computing device 200 may further comprise multiple servers distributed over a broad geographic area to reduce latency with respect to interactions with client server devices, wherein a given server (or servers) may serve client computing devices in its geographical area. The various master server computing devices may include network interfaces and may be interconnected via high speed data networks to further reduce latencies. The cluster nodes may include dedicated high speed graphic processors to process virtual/augmented reality graphic tasks. The master server computing device 200 may include one or more administrator terminals.

Similarly, as illustrated in FIG. 2, one or more client computing devices 210, 220 (e.g., a general purpose computer, a tablet computer, a cloud-based server, a smart phone, a graphics processing unit, a game console, etc.) are coupled to the master server 200 over a data network 250 (e.g., a local area network, a wide-area network, the Internet, a private network, a public network, etc.). Optionally, each client device 210, 220 can connect with other client devices via the data network 250 (e.g., in a peer-to-peer manner). Optionally, a given client computing device 210, 220 may be connected directly or over a network to a console which displays a user interface via client software 215, 225 to a user/participant or operator and which can be used to provision, designate, and configure the given client computing device 210, 220 (e.g., download and/or upgrade software, provision data communication interfaces, configure accounts, administer security, edit files, etc.). Optionally, a given client computing device 210, 220 provides a computing platform for compiling and/or executing certain programs and/or programmatic scripts, receiving and sending certain communications, performing video/image processing tasks, identifying distinct markers from recorded infrared light, calculating marker positions in space, performing math computations, enabling the displaying/rendering of certain images (e.g., rendering virtual worlds or augmented images), etc. For example, a given client computing device 210, 220 may include a 3D rendering engine, a 3D sound engine, a virtual reality execution engine, an avatar engine, a simulation state synchronizer engine, a session manager engine and/or a network interface.

Figure 3:
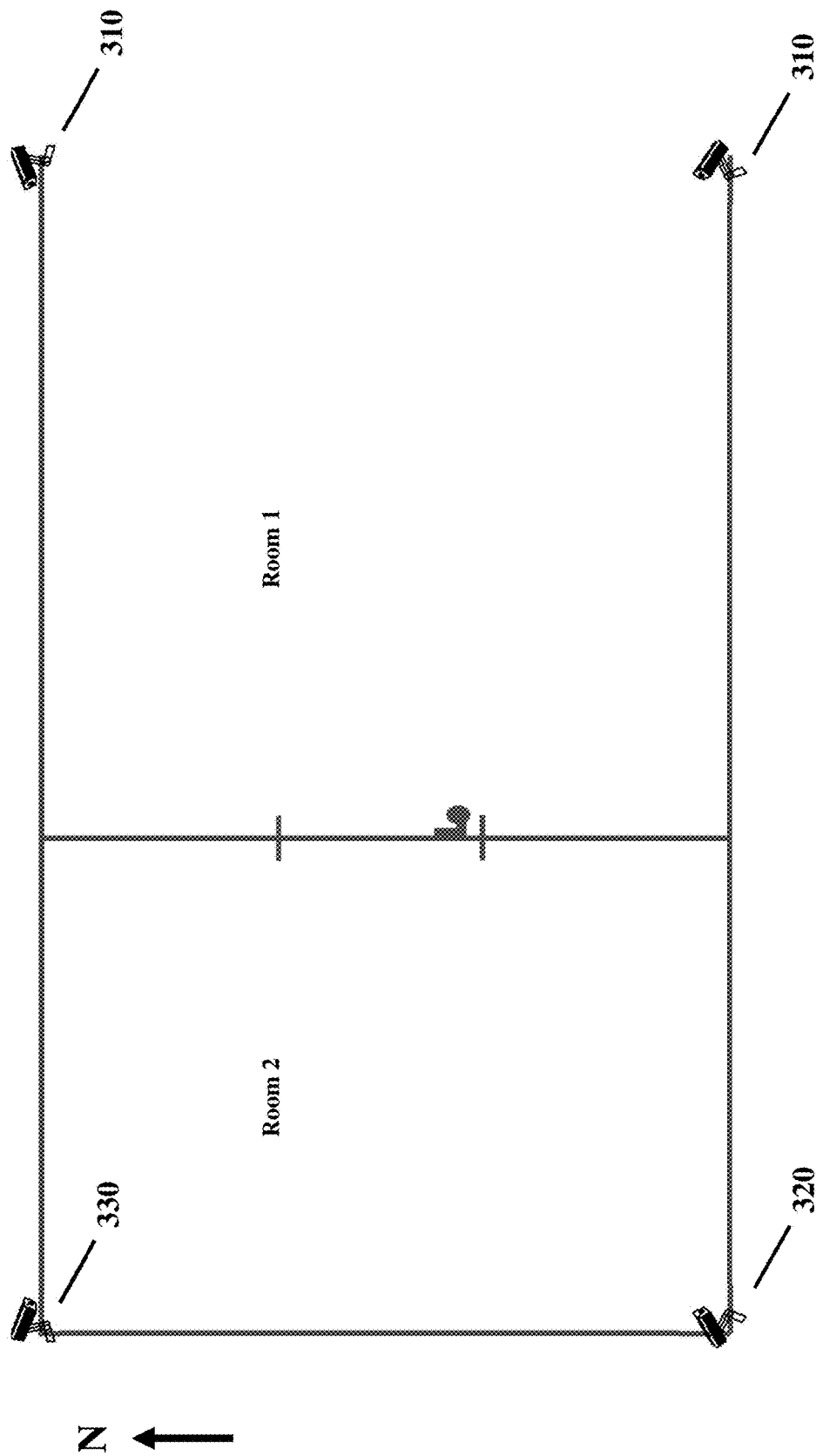
FIG. 3 illustrates an example operating environment of a precision positioning tracking motion capture system of a clustered system.

FIG. 2 also illustrates an optional element of the cluster system, a plurality of motion capture cameras 310, 320, 330, and 340. Motion tracking is a crucial component of most virtual reality systems. By tracking the position and orientation of the user, the cluster system can control the simulation's viewpoint such that the user can navigate through the virtual world just as naturally as they would navigate through the physical world. In addition, tracked movements of an individual in the physical world may be mapped onto certain movements of an avatar in the virtual world. Optionally, these motion capture cameras 310-340 are connected physically via cabling or wirelessly to the data network 250 and/or directly to the master server 200, client 210, and/or client 220. Optionally, the video output and/or detected marker identities and marker positions are streamed from the cameras 310-340 to the master server computing device 200 and/or the client computing devices 210,220 as further described herein below. Optionally, a plurality of motion capture cameras are positioned above and/or reside within a staging area in which VR session users participate in a simulation. FIG. 3 illustrates an example camera positioning in a simulation. By way of example, multiple (e.g., 2, 4, 6, 8, 9, 10, 11, 12) tracking cameras (e.g., precision position tracking (PPT) cameras, such as the PPT X™ precision motion tracking cameras from WorldViz LLC of Santa Barbara) may stream live video to a master server computing device 200, or a client computing device 210, 220, which are provisioned with virtual reality tracking software (e.g., the Vizard VR™ toolkit or PPT Studio from WorldViz LLC of Santa Barbara; dll for Windows; C source library for Linux) capable of image processing live video images in substantially real-time.

Optionally in addition or instead, a dedicated computing device 230 (e.g., a laptop, PC, smartphone, server, etc.) may be optionally provisioned with the virtual reality tracking software (e.g., Vizard VR and/or PPT Studio from WorldViz LLC of Santa Barbara) capable of processing the received live camera output stream in substantially real-time. Optionally, the motion capture cameras record image data including emitted infrared light in a tracking area. Optionally, the recorded image data is provided (e.g., streamed) to the computing device 230 or other computing device via a data network (e.g., 250). Optionally, the computing device receiving the image data has certain software (e.g., PPT Studio software from WorldViz LLC of Santa Barbara) capable of determining from the image data, a position and identity for each infrared marker in the field of view/tracking area of the motion capture cameras.

Optionally, the calculated/determined/derived marker position and identity information (e.g., tracking data) may be used (e.g., by the computing device) to render a change in a scene or orientation of a scene as viewed by a user (e.g., in a head mounted display or other display). For example, infrared markers may comprise light emitting devices (LED) which may be configured to be attached to or mounted on an item worn by the user (e.g., headgear). Optionally, a marker device can be attached to articles of clothing and/or strapped or otherwise attached to or physically associated with a user. Optionally, an infrared marker tracking device includes two or more light emitting components attached to one or more items worn by the user and the system tracks the light source in three dimensions to determine the user's movements in time. Optionally, head movement tracking data is collected in substantially real-time and can be used, for example, in a virtual reality display in which some or all of the displayed images are modified coincident with the tracked movement of the user. For example, if the tracking system detects sideways movement of the user, the perspective and/or the displayed image viewed by the user may be modified to simulate the sideways movement of the user (e.g., displaying an image behind a tree which was obstructing the user's view prior to the user's sideways movement).

For example, the virtual reality tracking software 660 may incorporate a visual tool for configuring devices that the VR tracking software supports, including displays (e.g., head-mounted displays, multi-screen projection walls, consumer 3D monitors), trackers (head trackers, gloves, full body motion capture), and input devices (e.g., wands, steering wheels, gamepads, joysticks, etc.). The VR tracking software may enable editing of transform nodes (e.g., position, rotation, scale), clone/copy nodes, rename nodes, delete nodes, insert new group/transform nodes, and add/remove/modify descriptors. The VR tracking software may enable the layout of a virtual scene by combining and arranging multiple independent 3D models. The VR tracking software may enable a given virtual reality scene or objects to react to a user's natural body motions. Thus, for example, the VR tracking software may enable a user to interact with head, hands, and feet with virtual objects in a manner similar to real objects to provide a convincing sensation of telepresence. The VR tracking software optionally provides full body motion capture technology that delivers full human presence for both first person point of view and third person points of view experiences. The VR tracking software optionally enables the integration of live full feature avatars.

Other optional features of the PPT X cameras of the clustered system may include some or all of the following: charge-couple device camera sensors; three degrees-of-freedom positioning; six degrees-of-freedom (X, Y, Z, yaw, pitch, roll) positioning with an optional sensor; approximately 5 meter, 15 meter, 30 meter camera range and a recommended tracking space of approximately 10 meters by 10 meters by 10 meters, or other tracking space; multiple (e.g., 2, 4, 6, 8, 9, 10, 11) independent three degrees-of-freedom tracking targets (where, for a marker to be tracked, preferably the marker is visible by two or more cameras); tracking precision of approximately less than 0.5, 1, 2, or 5 millimeters over a 3 meter by 3 meter by 3 meter volume; optical sensor precision may be about 1:10,000, 1:20,000, 1:30,000 arc at 75 percent; tracking accuracy of approximately less than a 0.1, 0.5, or 1 centimeter over a 3 meter by 3 meter by 3 meter volume; a field of view of 60, 68, 75, or 80 degrees horizontal (standard) and 80, 88, 95 degrees horizontal (wide) for each camera (and not, for example, the resulting trackable space of the system of cameras); less than 30 seconds, one minute, or two minutes calibration using a digital calibration rig; a 30 HZ, 60 Hz, or 120 Hz update rate; a centralized computing device for image processing; a maximum cable length to cameras of approximately 15 meter, 30 meters 50, meters, or 75 meters; analog camera interface; minimum latency of 10, 18, or 30 milliseconds; interface options (e.g., RS-232, USB, Bluetooth, WiFi, etc.), 115.2 kilobits per second, streamed or polled and Ethernet; and, ambient conditions utilizing indoor fluorescent or other lighting; camera size of 160 by 70 by 60 millimeters and weighting 500 grams. It is understood that dimensions, ranges, and components, other than those recited above, may be used.

Optionally, high performance precision position tracking (PPT) cameras (e.g., 1-32 high performance Precision Position Tracking cameras, such as the PPT E™ precision motion tracking cameras from WorldViz LLC of Santa Barbara) configured to record image data, detect infrared light, and determine the identity and position of detected infrared markers and output stream two dimensional centroid coordinates of the detected infrared markers in the camera field of view (e.g., as similarly described above for the PPT X but via onboard camera image/video processing in the case of PPT E), among other features, to the master server computing device 200 and/or the client computing device 210, 220. Optionally, the marker position data (e.g., tracking data) may be used (e.g., by the computing device) to render a change in a scene or orientation of a scene as viewed by a user (e.g., in a head mounted display or other visible display). Other features of the PPT cameras of the clustered system may include some or all of the following: color or black and white complementary metal-oxide-semiconductor camera sensors; three degrees-of-freedom positioning; six degrees-of-freedom (X, Y, Z, yaw, pitch, roll) positioning with an optional sensor; approximately 5, 10, or 20 meter camera range or other working camera range, and a recommended tracking space of approximately 20 meters by 20 meters by 10 meters, or other tracking space (where, for a marker to be tracked, preferably the marker is visible by two or more cameras). Overall tracking space dimensions may be determined by the camera range, camera layout, and background lighting. Other optional features may include 1-32 independent three degrees-of-freedom tracking targets; tracking precision of approximately less than one-quarter of a millimeter over a 3 meter by 3 meter by 3 meter volume; optical sensor precision is 1:20,000 arc at 75 percent; tracking accuracy of approximately less than a quarter of a centimeter over a 3 meter by 3 meter by 3 meter volume; a field of view for a given camera of 79 degrees horizontal (standard) and 98 degrees horizontal (wide) for each camera (and not, for example, the resulting trackable space of the system of cameras); less than one minute calibration using a digital calibration rig; 180 Hz update rate; centralized computing device for image processing; maximum cable length to cameras of approximately 200 meters; analog camera interface; minimum latency of approximately 20 milliseconds; interface options include Ethernet, using VRPN (Virtual-Reality Peripheral Network)); compatibility with certain ambient conditions (e.g., indoor fluorescent lighting); and camera size of 45 by 32 by 92 millimeters and weighting 145 grams. It is understood that dimensions, ranges, and components other than those recited above, may be used, such as those discussed with respect to other embodiments.

As previously described herein, the motion tracking cameras 310-340 record emitted infrared light pulses (e.g., emitted infrared light pulses) from tracking emitter devices associated with a VR participant. An example tracking device which emits trackable infrared light signatures is a wireless Precision Position Tracking (PPT) device, PPT Eyes™, from WorldViz LLC of Santa Barbara. The PPT Eyes is a motion tracker mountable to 3D glasses or VR head mounted displays which provides wide-area tracking and can be integrated with or attached to display headgear enabling the tracking of a user's head and/or body movements when combined with virtual reality tracking software. The tracking software, which optionally executes on board the camera 310-340, on the master server 200, a standalone computing device/server 230, and/or client computing device 210, 220, is capable of identifying via the streaming camera video the one or more markers of the PPT devices. Other features of a head mountable wireless PPT device may include some or all of the following features: a power button on top (or elsewhere) for easy user access; a housing imprinted with LED identifiers (e.g., LED1:1 and LED2:R) for clarity with signal identifier codes; a rechargeable (e.g., lithium ion) battery with an optional endurance of 4, 6, or 8 hours (with low intensity setting) with a range of more than 20 meters (with high intensity setting) without impacting performance; optionally factory or self-mounted onto commercially available passive and active 3D glasses; automatic "go-to-sleep" mode if not moved for a first period of time (e.g., 30 seconds), and turn off after a second period of times (e.g., 10 minutes) to save on battery power; user switchable between USB charge mode and USB power mode; easily reprogrammable device settings (sleep mode and turn-off timer periods, LED Identifiers, LED light intensity) via a simple application (or via software toolkit from WorldViz LLC of Santa Barbara) wherein the device is connected to a user's computer via a wired or wireless interface (e.g., a micro USB port); compatible with a plurality of protocols (e.g., TrackD, VRPN, WorldViz PPT Studio™, etc.); six degrees-of-freedom (X, Y, Z, yaw, pitch, roll) enabling the full determination of left/right eye locations needed for stereoscopic viewing; angular range of a full 360 degrees—all axis; tracking precision of approximately less than a quarter of a millimeter over a 3 meter by 3 meter by 3 meter volume with a rotation precision of 0.09 degrees; position accuracy of approximately less than a quarter of a millimeter over a 3 meter by 3 meter by 3 meter volume with a rotation accuracy of one degree RMS yaw, one quarter of a degree RMS roll; update rate of 180 Hz); latency of no more than 20 milliseconds; light weight 30 grams (with two infrared red diffusion balls); device size of 203 by 14 by 32 millimeters; active LED mode (PPT Marker IDs). It is understood that dimensions, ranges, and components, other than those recited above, may be used, such as those discussed with respect to other embodiments.

Optionally, the motion tracking cameras record emitted infrared light pulses from tracking devices held by a user. An example handheld tracking device which emits trackable infrared light signatures may be a wireless Precision Position Tracking (PPT) Wand™ from WorldViz LLC of Santa Barbara. The PPT Wand is a wireless, battery powered wand. The wand provides interaction and navigation in immersive virtual reality systems and may include a joystick/pad and trigger enabling hand tracking and hand grabbing and/or moving of virtual objects. Other optional features of a handheld wireless tracking device may include some or all of the following: a rechargeable (e.g., lithium ion) battery endurance of 8 hours with a range of more than 20 meters without impacting performance; an ergonomic one-handed design, vibrant button touch, and a multitude of input modes; automatic "go-to-sleep" mode if not moved for one minute, and turn off after 10 minutes to save on battery power; user switchable between USB charge mode and USB power mode; easily reprogrammable wand settings (sleep mode and turn-off timer periods, LED Identifiers, LED light intensity) via a simple application (or via software toolkit from WorldViz LLC of Santa Barbara) wherein the wand is connected to a user's computer (e.g., wirelessly, via a micro USB port, or via other interface); compatible with a plurality of protocols including TrackD, VRPN, and WorldViz native PPT protocol; six degrees-of-freedom (X, Y, Z, yaw, pitch, roll); angular range of a full 360 degrees—all axis; tracking precision of approximately less than a quarter of a millimeter over a 3 meter by 3 meter by 3 meter volume with a rotation precision of 0.03 degrees; position accuracy of approximately less than a quarter of a millimeter over a 3 meter by 3 meter by 3 meter volume with a rotation accuracy of one degree RMS yaw, one quarter of a degree RMS in pitch and roll; update rate of 180 Hz with PPT E series); latency of 20 milliseconds with PPT E series; light weight 196 grams; wand size of 239 by 65 by 110 millimeters; passive and active LED mode (PPT Marker IDs). It is understood that dimensions, ranges, and components, other than those recited above, may be used, such as those discussed with respect to other embodiments.

Other optional motion tracking features which can be employed in the clustered system include but are not limited to: inertial-based motion tracking, magnetic-based motion tracking, optical motion tracking, motion capture suits, and/or other motion tracking systems that may be utilized in virtual reality applications.

In the example clustered system, certain input devices may be provided for a user to manipulate (e.g., by one or more of the following: grasping, placing an object, finger flexion, abduction between fingers, thumb crossover, palm arch, wrist flexion, wrist abduction, etc.) the environment during a virtual reality session. For example, the input device may include one or more of the following examples: gamepads, joysticks, mouse, keyboard, haptic glove, wand, and/or other input devices used to manipulate an environment that may be utilized in a virtual reality application.

In the example clustered system, certain displays may be employed to present a virtual reality experience to a user including but not limited to: stereophonic displays (e.g., Oculus), a Cave Automatic Virtual Reality (CAVE) 3-dimension projector system with single display wall, a 2-dimension monitor, a 3-dimension monitor, and/or other display devices that may be utilized in a virtual reality application. Optionally, the cluster system integrates motion tracking to enable certain displays, including 2-dimensional displays, to render the worlds appropriately so that users feel as though they're looking beyond the wall into the virtual world (e.g., the images adapt to movement so that users feel more like they are looking through a window than looking at a picture).

Example Multi-User Embodiment

An example of a collaborative Virtual Reality (VR) session illustrates certain optional features and advantages of the system in which user actions and display of such actions are synchronized across varying hardware devices with minimal programmatic and configuration effort on the part of VR developers/content creators. Advantageously, because the example clustered system manages the underlying communications, the simulation execution and control, and the Avatar positional changes for each participant in a multi-user simulation, the system enables VR creators to focus their efforts on the content of a simplified simulation scenario/environment (including for example, a single-user simulation). Further, this example embodiment illustrates a novel approach to a multi-user simulation environment which enables local contextual computing in association with each VR participant in order to present certain aspects, for example participant's actions of a first type, of the simulation in substantially-real time (e.g., with minimal display delays and/or communication latencies, such as those that would not be perceived by a user) to the VR participant. By contrast, certain other aspects of the simulation, for example participant's actions of a second type, are only partially processed in a local context or are not processed at all in the local context but rather are processed in a remote context. Tracking data associated with the second type of participant's action may be transmitted to and received at a master server for centralized processing (e.g., at a master server) and then scene rendering content changes are performed by the master server and distributed, over a communication medium (e.g., a data network), to each client participant in the multi-user session. Therefore, in certain simulations, the data sent between the master and clients is primarily limited to the position and orientation of the participants of the simulation.

In this illustrative example, two users experience an interactive VR session (hereinafter referred to as a simulation or VR simulation) in which the users begin in a first room and one user walks into a second room (it is understood that this example assumes two users for clarity, although other scenarios may have more than two users). FIG. 1 illustrates a configuration of the two rooms 100, 105 of the simulation. Room 100 is configured with a sliding door 110 which enables a user to walk from Room 100 to Room 105 upon opening the sliding door 110. In this example, the sliding door 110 and the wall separating Room 100 and Room 105 are merely a simulation as there is no physical wall separating Room 100 and Room 105 in the real world (although Rooms 100 and 105 may be physical, real world rooms). Further in this example, Room 105 is configured with the adjoining sliding door 110 and a physical chair 120 facing the door 110, as illustrated in FIG. 1. In addition, in this example, the sliding door 110 slides opens in response to the application of a left-to-right hand movement from a user and automatically closes from right-to-left when no pressure is applied to the door or door handle. In this example, a first user 150 is initially positioned to the left of a second user 155 and, correspondingly, the second user 155 is positioned to the right of the first user 150. Both users begin the VR session/simulation at the eastern portion of the room, each facing west towards the sliding door 110.

In this example, a system of four tracking cameras 310-340 (e.g., a motion capture system including, for example, a PPT X camera system running at 60 Hz or a PPT E camera systems running at 180 HZ, both from WorldViz, LLC of Santa Barbara, Calif.) are configured in the VR session in order to track certain user movements of the first 150 and second 155 users via a set of trackable infrared LED markers attached to or configured in association with each user, see also FIG. 3. For example, a precision positioning tracking device, such as the PPT Eyes tracking device from WorldViz, may be affixed to a wearable head mounted display 170, 175 of each user to track each user's head and body movements/travel. In this example, each user's right hand is configured with a haptic glove 160 and 165 respectively, where the haptic glove is configured to simulate a touch sensation when a user interacts with an object in the simulation to enable a wearer to "feel" a virtual object as if it really existed, and wherein the glove further includes a one or more trackable infrared LEDs and/or finger movement sensors.

In this example, at least four separate computing devices and/or computing servers 200, 210, 220, and 230 are employed in the simulation as previously described herein, see also FIG. 2. In this example, computing server 200 is configured as a master computing server and is provisioned in association with server program software 205 (e.g., WorldViz cluster master from WorldViz LLC of Santa Barbara). In this example, computing device 210 (e.g., a Graphic Processing Unit (GPU), a processing unit to provide rapid visual/display processing) is provisioned in association with a software client 215 (e.g., a WorldViz cluster client from WorldViz LLC of Santa Barbara) and wherein the client is configured in a client-server relationship with master server software 205, as further described herein below. Similarly, in this example, computing device 220 (e.g., a GPU) is provisioned in association with a software client 225 (e.g., a WorldViz cluster client from WorldViz of Santa Barbara) and wherein the client is configured in a client-server relationship with master server software 205, as further described herein below. Each of the three computing devices are interconnected via a local-area or wide-area data communication network 250 as further described above.

In the example embodiment, the cluster system performs a set of initialization and/or connection acts, such as a simulation launch, followed by the actual simulation. These initialization and launch acts, and the simulation of the example embodiment are further described below.

In this example, the master server 205 and clients 215, 225 initialization proceeds the client-server connection process. Optionally, the connection process proceeds the initialization process. Optionally, the initialization process may be manually performed by a user (as opposed to being automatically performed by the system) and occurs independent from any client-server binding/association.

Virtual Reality Initialization

As previously mentioned herein, clustering environments enable the distribution of computational tasks across multiple computing resources within a network of computers, thus, enabling the simulation of computationally expensive virtual/augmented reality worlds. To avoid bogging down the network (e.g., creating network latencies) during a simulation the amount of data that each computer transmits and receives is minimized. This is accomplished by, for example, loading the virtual world on each computing device and then pass only the data that is unique to the local/client computer. In this example, the master server 200 and each client 210, 220 are initially seeded with a set of identical copies of executable programmatic code and associated data (e.g., resource files and modules), which is loaded during the initialization process or during runtime. This limits the primary communications between the master server 205 and clients 215, 225 during the VR session to synchronization calls which keep the viewpoint and scenegraph states identical across all clients in the multi-user VR simulation. The synchronization may be performed in substantially real time (so that any delay is not perceptible or is barely perceptible, to users). Optionally, resources, such as models, textures, and audio files are not generally transmitted from the master to clients during the VR session.

Optionally, the resources needed for the simulation in this example are downloaded from the master server's data store 202 to the clients and stored in each client's data store 212, 222, wherein the data stores comprise computer memory and can be configured as a general purpose file system, tables, flat databases and/or SQL databases by way of non-limiting illustrative example. Optionally, to avoid distributing/downloading/uploading files and/or copies of files across computing servers and computing devices, a file sharing network with a common data store may be employed with absolute, full network paths (e.g., beginning with a drive letter followed by the rest of the path) or relative paths (a path relative to the current directory) to the stored resources specified at each participating computing server and/or computing device.

Optionally, the simulation initialization is initiated in response to a user/administrator selection (e.g., the first user 150, the second user 155, or a third user) of a control at the master server 205. The master server 205 downloads to each client computing device 210, 220 the executable code and resources to be used in the VR simulation. Upon receipt of the executable code and resources, each networked client 215, 225 loads their respective data store 212, 222. Optionally, the code and resources are downloaded directly by the master into the data store 212, 222). Optionally, any problems and/or detected errors in loading the code and resources are reported to the administrator/user who initiated the download such that the administrator/user can take corrective action. Optionally, each client in the network of clients (e.g., 215, 225) independently requests (e.g., via a user interface control of the software clients 215, 225) the master server 205 to initialize each client's respective data store 212, 222. Optionally, any or certain detected errors in client initialization are displayed to the associated client administrator/user and/or the administrator/user of the master server 205 in order to take corrective action. When initialization completes (e.g., without fatal errors), the clients 215, 225 are data store synchronized with the master server 205 and the initialization step is complete.

Cluster Connection Management

The cluster client software program enables a client computing device to receive signals/requests/messages to launch a simulation (e.g., to receive a signal from an associated/bound master server software program) and synchronize user actions during a launched simulation (e.g., via a synchronous (sync) update from an associated/bound master server program). In this example, the users 150, 155 launch their respective client software programs 215, 225.

The master server software program enables a master computing device/server to send signals/requests/messages to launch simulations (e.g., to send a signal to one or more associated/bound clients) and synchronize user actions across the associated/bound client programs. In this example embodiment, a user (e.g., users 150, 155) or an operator launches an instance of the master server software program 205 on the computing server 200. Optionally, the master server program 205 displays, via a user interface, the computing devices 210, 220 that are connected over a communication medium (e.g., a local-area or wide-area data network) and that are running the cluster client software programs 215, 225. Optionally, the master server program 205 user interface displays the IP address of the data connected computing devices/servers and the name of each client 215, 225. Optionally, the server program 205 provides an add control (e.g., a check box control) by which a user 150, 155 or an operator of the cluster computing system can associate/bind a given client with the master server in the network of connected clients. Optionally, more than one instance of the client software program can be launched per computing device/computing server, including the master server 200. Optionally, the master server program 205 enables, via a user interface, a user/operator to specify a data communication port (e.g., a TCP/IP port) in which the associated/bound master server and client programs can communicate over a local-area or wide-area data network. Optionally, the master server program 205 enables, via a user interface, a user/operator to refresh the list of connected clients by, for example, broadcasting a message to the cluster clients and waiting for their response.

Optionally, the master server program 205 provides certain cluster synchronization processes to ensure the multi-user VR session is reliably and timely synchronized across all clients. If for example, a client were to fall behind with respect to rendering or enable rendering in a multi-user session, the VR experience for the lagging client, and other participants viewing the client, might seem sub-optimal, unrealistic and/or sluggish. These processes optionally include but are not limited to: sync frames, sync draw, and sync resources. Optionally, if the sync frames process is enabled via a user interface of the master cluster 205, each client computing device/server blocks (e.g. delays a period of time, delays until a condition is satisfied, delays until a signal is received, delays until a routine completes, delays until a message is received, etc.) at the end of each frame until all other computing devices/servers finish processing their updates for that frame (as determined by the master server program 205 by, for example, receiving a frame update complete message from each client or its equivalent (e.g., a function call unblocks)). For example, in a blend screen simulation configuration. it may be the case that a client would prefer a drop in frame rate rather than ever seeing a discrepancy (e.g., a screen tear) across blended or butted displays. Optionally, if sync draw is enabled and sync frames is enabled, in addition to blocking until all updates are complete, the client computing device/servers 215, 225 will optionally also block until all other client computing device/servers 215, 225 finish rendering their respective frame. Optionally, if the sync resources function is enabled, all resources in a script/executable code folder are automatically synchronized with the connected clients when running a VR simulation/session. Optionally, when the resource syncing function is enabled, a resource filter can be configured/programmed by the user/operator to block certain file types from being synced from the master with the clients. For example, a user can exclude log files from being sent to a specified client or all clients (e.g., to reduce network congestion and latencies). Optionally, multiple filters can be configured/programmed to restrict more than one type of resource (e.g., models, textures, etc.) synchronization with connected clients.

Optionally, the master server program 205 executing on the master server provides certain cluster session timer controls to ensure the multi-user VR session is adequately synchronized across all clients. A synchronization timeout or series of synchronization timeout events may cause an operator or user of the VR session to halt the VR session and take corrective action to repair the troublesome client(s).

Optionally, the master server program 205 enables a user/operator to change a default time period (e.g., 100 milliseconds, 500 ms, 1 sec, etc.) the cluster master and client program will wait after a timeout occurs before attempting to establish a data connection (e.g., a TCP/IP data connection) to attempt synchronization. Optionally, in the event of a timeout, the cluster master 205 and/or client program 215, 225 will automatically retry synchronization a configurable number of automatic retries before determining that the problem that caused the timeout is not correctible without further action. Optionally, a failed retry and/or a failed connection attempt is reported to the user/operator of the client and/or master server as an alarm/error (e.g., via a user interface displayed on a display and/or via an audible alert) and/or logged as an error to an error log file.

Optionally, the master server program 205 enables a user/operator to change, via a user interface, a default time period which the cluster master 205 and client program 215, 225 will wait to finish sending/receiving messages for each frame in a VR session (e.g., 100 milliseconds, 500 ms, 1 sec, etc.). Optionally, in the event message sending and/or receiving for a frame exceeds a specified default time limit, a failed frame alarm/error may be reported to the user/operator of the client and/or master server (e.g., via a user interface displayed on a display and/or via an audible alert) and/or logged as an error to an error log file.

Optionally, the master server program 205 enables a user/operator to change a default time period the cluster master 205 and client 215, 225 programs will wait for synchronization to complete at the end of each frame (e.g., 100 milliseconds, 500 ms, 1 sec, etc.). Optionally, in the event the synchronization for a frame exceeds the specified default time limit, a failed frame alarm/error may be reported to the user/operator of the client and/or master server (e.g., via a user interface displayed on a display and/or via an audible alert) and/or logged as an error to an error log file.

Optionally, during the initialization and/or connection process, an exchange of resource types and/or hardware component types and capabilities occur between the master server program 205 and associated clients programs 215, 225. For example, the resource and hardware exchange can include the manufacturer and model of the client head mounted display, the pixel resolution of the client display, the make and model of the graphic processing unit, the make and model of a hand held wand used in association with a client, etc.

Virtual Reality Rendering Startup

In this example, after the initialization and connection processes are complete, the master initiates a second command or sequence of commands to cause the clients to load the executable code of the VR scene in the render engine of each client computing server 210, 220. Optionally, any problems and/or detected errors in loading the VR scene into the render engine are reported to the first user 150 and second user 155 via the user's head mounted display 170 and 175, respectively, and/or a separate console/monitor of the client computing server 210, 220. Optionally, any detected problems and/or detected errors are mirrored to and/or exclusively provided to the master server program 205. Optionally, any detected errors are logged to the master server's data store 202 and/or displayed via a console/monitor to an operator of the master server 200. Optionally, the master server program 205 takes certain automatic action to repair detected errors, including for example, reloading the render engine of the client 210, 220, optionally, with certain modified parameters. Optionally, the master server program 205 waits for a repair action to be initiated by the operator. Optionally, each client in the network of clients independently loads their respective render engine. After each client's render engine is loaded, the multi-user simulation is ready to begin.

Virtual Reality Simulation

The cluster system is used to share the rendering of a scene across multiple image generators and/or display screens. The cluster system, and in particular the master server software 205, manages the viewpoint, or the rendered view, of each connected client, for example, by sending a sync command with certain position and orientation matrices of one or more avatars associated with the VR scene. By having the master perform certain computational tasks as described herein, the client's computational load is reduced enabling the clients to run more efficiently. Advantageously, as previously described herein, the rendered view is optionally further converted by the master server program 205 to a set of commands/formats compatible with the hardware of a given client based on an identification of the client hardware/software obtained during initialization or registration (e.g., the pixel resolution of the client display, the display type, etc.). Further, because the cluster system as a whole performs the motion capture tracking, image processing, position calculations, etc., and converts the received input into perspectively correct renderings for each client's view, the VR program creator is divorced from these low level technicalities and instead interfaces with an abstracted view of the cluster system, and can thus focus on other aspects of the simulation (e.g., the simulation model, training tasks to be achieved by the simulation, the simulation scripting, etc.).

As previously described, the cluster system may optionally cause the rendering of certain aspects of the VR simulation to occur on the computing device/server of the client (e.g., computing in a local context), independent from, and not immediately synchronized with other participants in the VR session. This local context position determination and image rendering will hereinafter be referred to as "privileged." Privileged operations and/or rendering enables the cluster system to provide immediate display/action feedback to the user (this can also be characterized as "high frequency" feedback) with little or no human perceptible latency (e.g., less than 10 ms, less than 5 ms, less than 1 ms), thereby enabling the simulation to feel as lifelike as possible.

An example of an action that may be treated as privileged is a rotation of a user's viewpoint display (e.g., a user wearing a head mounted display, configured with PPT emitters, looking to the right, left, up, down, etc.). It has been determined through research that if latencies in a visual rendering of a scene in response to a head movement exceed approximately 10 milliseconds, then the rendering of the virtual scene is no longer indistinguishable from a real scene from a participant's perspective. Depending on the individual and the task at hand, the discrepancy from a real scene as detected by the human visual system may lead to disorientation or sub-optimal performance. Therefore, in many types of simulations this action type may be configured to be privileged. Another example of an action which may be treated as privileged is tracked travel (e.g., walking) of a user. In both of these example privileged actions, the received tracking and positioning/orientation change data of the user are processed and rendered substantially immediately in a local context by the client computing device associated with the user.

Notably, the cluster system enables a first party to the system (e.g., a user, a participant, an operator, a content creator, and/or a developer/scripting agent, etc., or any combination thereof) to define/configure/program/designate the system to cause certain aspects or elements of the VR simulation to be rendered in a privileged manner. Optionally, the cluster system recommends to the first party, via a user interface displayed on a display, which aspects/elements should be privileged based at least in part on certain predefined, detected, and/or measured criteria including, for example, a measured latency of a network connecting the computing devices and/or tracking cameras that exceeds a specified threshold, or based at least in part on a measured processing latency of a connected computing device exceeding a threshold as determined, for example, by having the computing device perform certain computational operations. Optionally in addition or instead, the cluster system recommends to the first party which aspects/elements should be privileged based at least in part on the mass/size of a moveable virtual object and certain physics associated with an object (e.g., a large rock on a hill or a key in a lock). Optionally, in addition or instead, the cluster system recommends to the first party that certain predefined aspect/elements should be considered privileged such as head tracking, user travel, user limb movement, etc. Optionally in addition or instead, the cluster system recommends to the first party which aspects/elements of the system should be privileged based at least in part on the identification/detection of certain haptic devices (including, device make and/or model) on initialization wherein, generally, haptic devices are configured as privileged.

Optionally, the cluster system automatically configures for the first party certain aspects/elements of the system as privileged or not privileged based at least in part on one or more criteria described herein (e.g., measured latencies, measured processing capabilities, physics, haptic device outputs, etc.). For example, if the system measures a network latency between a master computing device 200 and a slave/client computing device 210, 220 that exceeds 10 milliseconds (or other specified threshold) the computing device may be automatically configured to operate in a privileged manner with respect to certain functions/portions of the simulation (e.g., previously identified as critical or potentially privileged) to thereby provide relatively reduced latencies.

Optionally, the system may provide a user interface via which the first party may define/configure/program/designate the system to cause certain aspects of the VR simulation and/or elements of the simulation to be rendered in a privileged manner dependent upon the type of application. The system may receive and act on the information and commands provided via the user interface. For example, in a multi-user sport training simulation, ball physics may be privileged to each user client. In another example, in a flight vehicle simulator certain responses, say control yoke and side-stick, need to be privileged in order to provide a low latency, realistic experience, whereas the attitude and position of the virtual flight vehicle do not need to be privileged as some latency (e.g., up to 200 ms or other threshold), will not adversely affect the realism of the virtual reality experience. As described herein, head movement and travel may optionally be generally configured as privileged operations. Limb movements, may be generally configured as privileged operations but can also be configured as non-privileged given measured network latencies and computing device processing capabilities.

Taste and smell are not generally rendered visually per se and, therefore, may be categorized as non-privileged in the client-server cluster configuration domain (which may optionally categorize which aspects may be privileged and which aspects are never to be treated as privileged). However, with respect to sound in multi-user simulations, there are certain situations in which it may be advantageous for sound to be rendered in a local context or privileged operation. Optionally, sound rendering intended to convey accurate angular and distance cues (e.g., gunshots, car engine and tire sounds, the sound of an object striking a surface, a person speaking, a dog barking, a door opening or closing, footsteps, etc.) may need to be privileged operations (and so are categorized as potentially privileged) because they are susceptible to latency and may be closely synchronized with a corresponding visual rendering. Ambient sound, such as, for example, background noise or music with no pinpoint localization needed, can be configured as non-privileged operations (e.g., processed by a master server or enabled by a communication channel via the master server).

In the cluster system, once a position matrix (which may include orientation information) of an action (e.g., of a user, part of a user, or object, etc.) is derived from the received tracking data by a client 215, 225 for a privileged action, the position matrix is sent to the master server program 205. Optionally, a client 215, 225 performs and transmits the position and orientation determination for each frame (or set series of frames) in order that the master server program 205 has as much information coming in as possible about the privileged operation. The position matrix received from the client 215, 225, coupled with the position data of the other simulation users (e.g., previously stored position data or position data determined/derived from tracking data), enables the master server program 205 to provide scene rendering information to each client 215, 225 wherein each client 215, 225 is configured to receive over the network scene position and orientation data suitable for local rendering (e.g., by a head mounted display or other display) and wherein the received client rendering information includes actions taken by other simulation users in a perspectively correct viewpoint. By way of illustration, an example of a perspectively correct viewpoint is where a virtual wall of the simulation may obstruct an observer's view of another user when the user travels, in the simulation, behind the virtual wall. In an illustrative example, the master server program 205 may provide client 225 position and orientation for the first user in a data array in response to certain conditions (e.g., frame event, time out event, set series of frames (e.g., 2, 3, 4, 5 frames, etc.), etc.) for local scene rendering. Similarly, the master server program 205 may provide client 215 with position and orientation for the second user.

Certain other VR actions may be considered and processed by the cluster system as non-privileged (e.g., remote or not in a local processing context). For example, the movement of a tracking wand or the movement of a user's hand may be categorized and treated as non-privileged. Non-privileged user action tracking data (e.g., marker tracking identity and position data received from motion tracking camera(s) or tracking computing server 230) is processed by the master server program 205 and positional scene changes/actions are identified for each connected client 215, 225 and downloaded (e.g., via a sync operation) to the connected clients for local context rendering (e.g., wherein each client 215, 225 is configured to receive over the network scene position and orientation data suitable for local rendering), including the client/user from which the action originated (as further described below).

In this example, each user is wearing a head mounted display 170, 175 with an attached PPT emitter (e.g., LED equipped PPT Eyes). Each user 150, 155 in this example, is also wearing a right-hand glove 160, 165 configured with finger motion sensors and one or more infrared LEDs. The LED(s) associated with the PPT emitter and glove may each emit a unique infrared light pattern/code (e.g., marker Identification (ID)) which is recorded by the tracking cameras. The light patterns emitted by the LEDs uniquely identify a user's head movement, user travel, and user's right hand movement. The PPT tracking camera output (e.g., either PPT X indirect output wherein the output may be processed by, for example, using PPT studio software using an intermediate computing device 230 (e.g., a dedicated computing device or a shared computing device such as the server 230 or PPT E direct output)) is received by the master server program 205 and client programs 215, 225. The output from the intermediate computing device 230 or direct output in the case of PPT E provides infrared marker identify and space position of the LED markers. The client programs 215, 225 similarly receive glove 160, 165 marker ID and finger movement sensor data.

Figure 4:
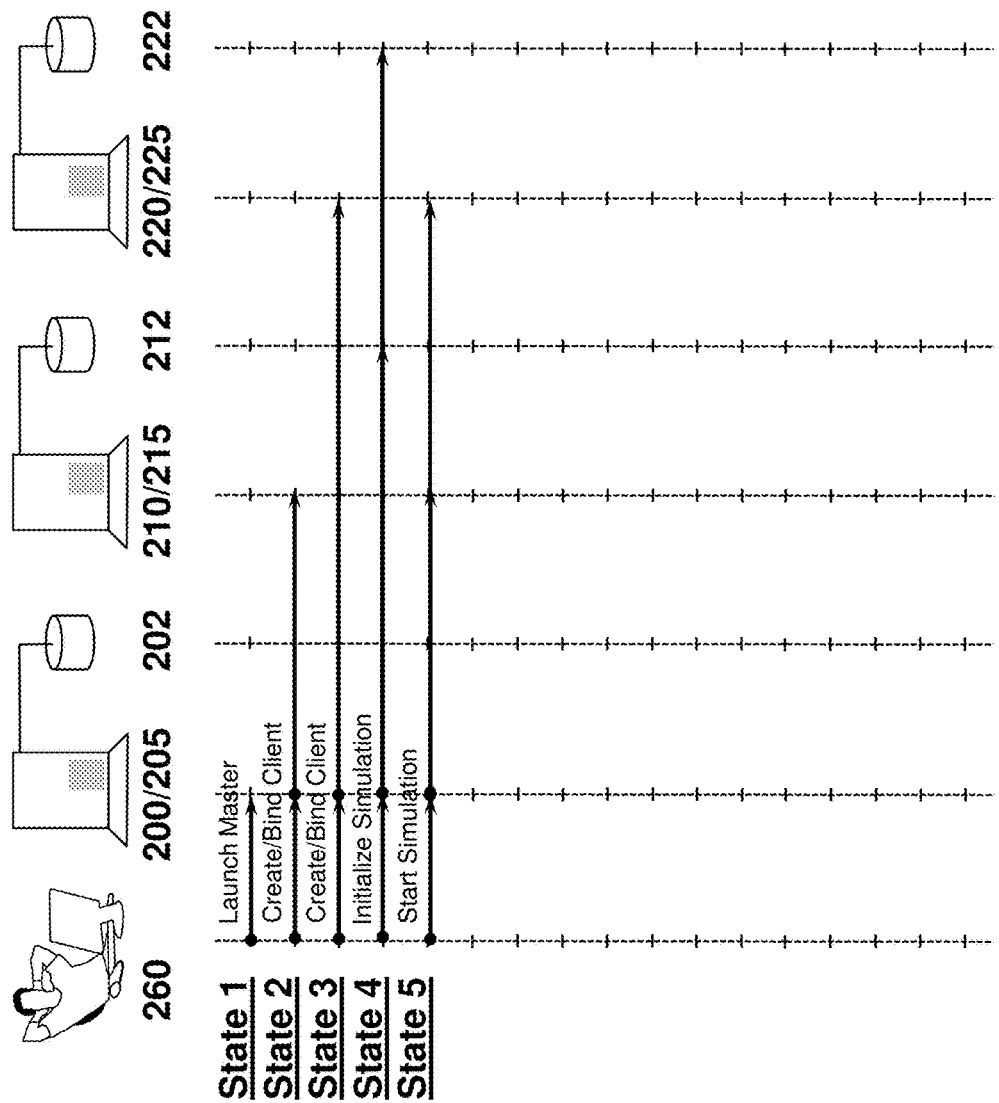
FIG. 4 illustrates a process of an example embodiment of a multi-user virtual reality example embodiment.
Figure 5:
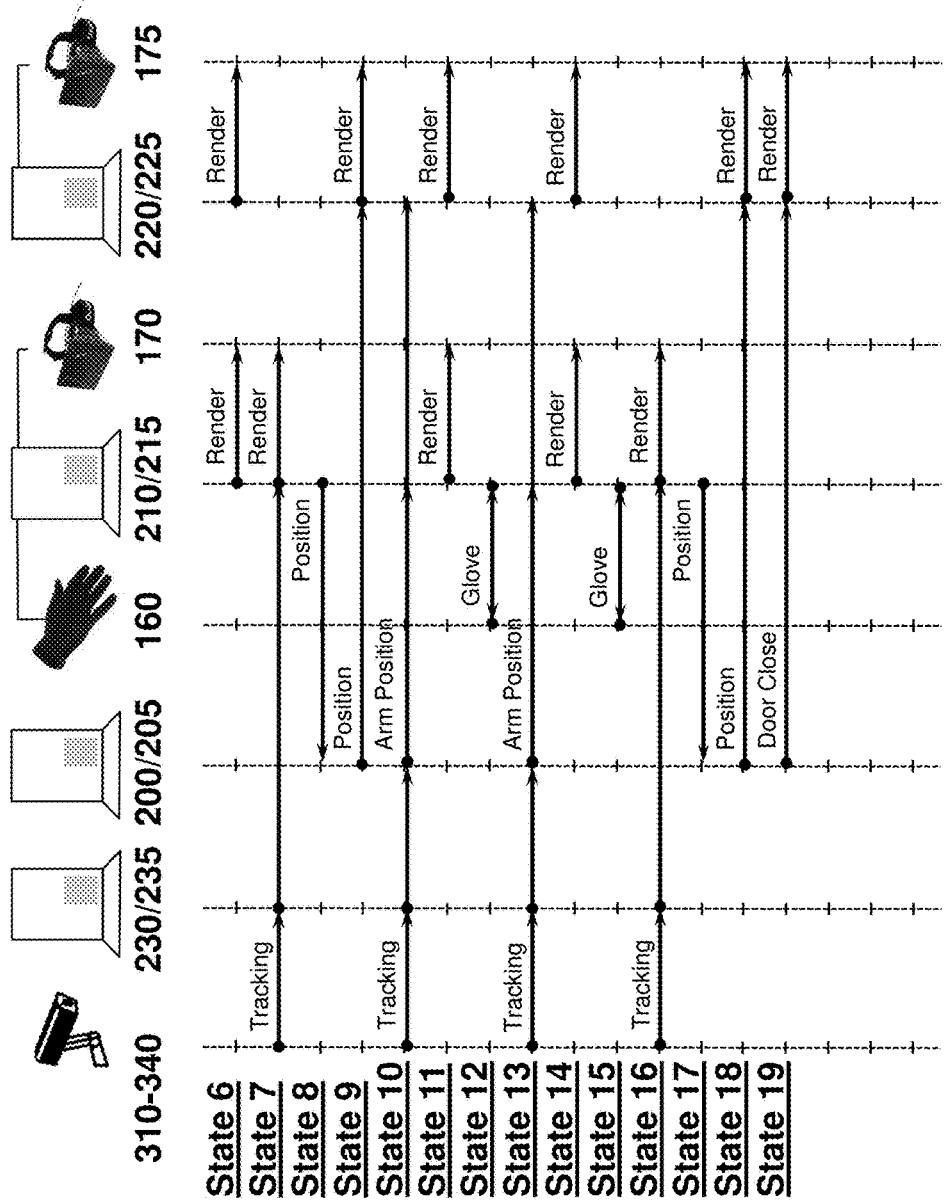
FIG. 5 illustrates a continued process of an example embodiment of a multi-user virtual reality example embodiment.

FIG. 4 and FIG. 5 illustrate a first example process workflow of the example clustered system discussed above. Process states are listed on the left and elements of the operating environment of FIGS. 1, 2, and 3 are listed across the top.

State 1. An instance of the master server program 205 launches on the computing server 200 (e.g., in response to a launch command provided by a system administrator via monitor 260).

State 2. The master server program 205 generates and provides for display a user interface on a console/monitor 260 that identifies the network connected computing devices 210 and 220 (e.g., using differentiating identifiers, such as an alphanumeric name and/or an icon). The master server program 205 receives, via the user interface, a selection by the system administrator of an add control, and in response, the master server program 205 creates an instance of a client 215 on the computing device 210 and binds (e.g., creates a client-server association/linkage enabling the master to send master initiated requests and data over a communication channel and receive client responses, client initiated requests, and data or other computer programming methods of software program/module association as known to those skilled in the art of data communications and/or software development) the created client 215 with the master server program 205. In this state or an earlier or later state the configured clients 215,225 and master server access configuration information indicating what types of operations associated with the simulation are privileged and what types of operations are non-privileged.

State 3. The actions of State 2 are repeated to create and bind client 225 on the computing device 220 with the master server program 205.

State 4. The master server program 205 initializes the simulation (e.g., in response to determining that the system administrator has selected an initialize control presented via a user interface of the master server program 205 presented on console/monitor 260), and downloads, over the network 250, to each client computing device's data store 212, 222 executable code and resources to be used in the simulation. In States 1, 2, 3, or 4 (or in a separate state) the tracking cameras 310-340 are also initialized and calibrated (e.g., with respect to the marker tracking devices used in the simulation). In addition, the unique infrared marker IDs (e.g., by each marker emitting a distinctive pattern) of the tracking devices are associated with users 150, 155 and clients 215, 225, respectively.

State 5. The simulation session begins (e.g., in response to detecting that the administrator selected a user interface control of the master server program 205 presented on console/monitor 260 initiating a virtual world script on the master server 205). In response to the control selection, the master server 200 initiates a simulation in each client 215, 225 (e.g., via a sync call/command/instruction).

State 6. In response to the VR launch, a display/scene of Room 100 is rendered (or caused to be rendered) in the head mounted display 170, 175 of each user 150 (first user), 155 (second user) via the client software 215, 225. In this example, the first user's viewpoint/display includes an avatar (e.g., a virtual representation) of the second user. The second user's viewpoint/display includes an avatar of the first user.

State 7. First user 150 walks from the front (East side) of Room 100 to the sliding door 110. The PPT motion tracking cameras 310-340 (e.g., PPT X cameras) record the first user's 150 steps, including in this example, the infrared light signal emitted by the tracking markers (e.g., a left marker and a right marker of a PPT Eyes tracking device) affixed to the Head Mounted Display (HMD) 170. In this example, a computing device 230 hosting a motion tracking software program 235 (e.g. PPT Studio) performs certain operations on the camera video output, including but not limited to, one or more of the following: an analog to digital conversion of the captured video (using an analog to digital conversion device and/or conversion software), identification of marker patterns and from the marker patterns identifies each marker in the camera field of view, calculations of two dimensional centroids of marker positions, determine the center point position between the two markers of the tracking device (e.g., PPT Eyes tracking device), etc.

At least partly in response to accessing the privileged operation configuration information, the client 215 executing on the computing device 210 receives the computing device 230 tracking data and performs certain calculations with respect to the infrared markers associated with the first user 150 to create a series of position matrices corresponding to the first user movement (e.g., wherein a given matrix may express the position/orientation coordinates in space of the first user 150 in 5 degrees of freedom, x, y, z, yaw, roll, or other degrees of freedom) and a new viewpoint is rendered (and/or causes a new viewpoint to be rendered) in the client/display 215,170 (e.g., via a local context privileged rendering operation as previously described herein).

The process of State 7 may be continually repeated as the first user 150 travels/walks to the sliding door 110 with the first user's head mounted display 170 displaying an expanding view of the wall separating Room 100 from Room 105 and the sliding door 110 (e.g., a scene of the simulation). Optionally, PPT E motion tracking cameras are used in place of or in addition to PPT X cameras, in which case the camera output includes marker identification and associated marker position data (including each marker position and/or a center point positon between two markers of a two marker tracking device) eliminating the need for the standalone computing device 230 to perform the operations.

State 8. Once each new first user position matrix is determined/generated for the first user in State 7, the new position matrix is sent/streamed by the client 215 over the data network 250 to the master server program 205. Optionally, the master server program 205 receives the new position matrix in response to a server request/calling function.

State 9. With respect to the master server program 205, the master server program 205 receives the position matrices from the client 215. With each received position matrix corresponding to the first user movement, the master server program 205 generates, based at least in part on and taking into consideration the current position data (e.g., including head position and body location) of the second user 155, a new orientation/position of the first user avatar (referred to hereinafter as avatar1). This new orientation/position of avatar1 is downloaded (e.g., via a synchronize call/operation/instruction) from the master server program 205 to the second client 225(and/or client computing device 220) for rendering in the head mounted display 175 of the second user 155. As each synchronized update is received from the server 205, the associated avatar1 positioning in the scene is rendered by the client/display 225, 175. The second user views in their head mounted display 175 avatar1 walking towards the sliding door 110.

As illustrated with respect to States 7-9 of this example, the cluster system manages the technicalities discussed herein associated with the substantially real-time communications between client and server and server and clients (e.g. real-time in nature but subject to certain processing and network transmission delays/latencies). In addition, this example illustrates how the cluster system manages/enables the various avatar renderings to occur in their perspectively correct views for each user in the multi-user system, wherein the user's view or viewpoint of each avatar/participant in the simulation is based in part on positional changes of each avatar/participant in the simulation (optionally including the extremities of each avatar/participant) together with positional changes from which each user views the simulation. Thus, because the cluster system manages the technicalities, the simulation content creator/developers may concentrate their creative efforts on the simulation application itself rather than having to code/develop programs to deal with such technicalities.

State 10. Upon reaching the sliding door 110, the first user 150 in this example reaches out with the gloved hand to grab a handle on the sliding door 110. In this example, arm movement is treated as a non-privileged operation (e.g., a remote server operation). The PPT motion tracking cameras 310-340 record the first user's 150 hand reaching towards the handle via the identified infrared light signal emitted by the LED marker(s) attached to, for example, the glove 160. At least partly in response to accessing the privileged operation configuration information, the master server program 205 executing on the computing device 200 receives the glove tracking data from computing device 230 and performs certain calculations with respect to the received infrared marker(s) associated with the first user's hand to create a series of hand position matrices (e.g., where a given position matrix expresses the position coordinates of the first user's hand). The resulting one or more position matrices are downloaded (e.g., via a synchronize command/operation/instruction) from the master server program 205 to the clients 215, 225.

State 11. Upon receipt by the client 215 of the hand tracking position data, a new position of the first user's hand is rendered (or caused to be rendered) in the first user's head mounted display 170. Upon receipt by the client 225 of the hand tracking position data, a new position of the first user's hand in Avatar1 is rendered in the second user's head mounted display 170. The position calculation sequence is repeated by the master server program 205 and rendering by the clients 215, 225 is repeated as the gloved hand of the first user reaches for the sliding door handle.

State 12. In this example, first user 150 grasps with the gloved hand the handle on the sliding door 110. From the received light emitted from the glove markers of the first user (e.g., the infrared light recorded by one or more of the cameras 310-340), and at least partly in response to accessing the privileged operation configuration information, the master server 205 identifies by way of the output from computing device 230 that the first user's right hand has made contact with the sliding door handle (e.g., via a position in space of the first user's extended right hand) of the simulation (note, in this virtual reality simulation embodiment there is no physical door or handle).

In this example, the master server 205 instructs (e.g., via a non-privileged master server synchronize command/operation/instruction directed only to client 215 using, for example, a masking synchronous command/operation/instruction) the client 215 to create a sense of touch in the gloved hand of the first user, by for example, causing via an instruction/operation the inflating of a collection of air pockets in the glove 160 on the palm side to create pressure force against the user's hand. Thus, optionally, touch feedback is processed/caused as a non-privileged operation.

Alternatively or in addition, optionally the cluster system uses the sensors in the glove 160 (rather than the determined position of the glove hand) of the first user to detect a grasp action by the user (this example privileged operation is illustrated in FIG. 5 rather than a non-privileged operation described herein above). At least partly in response to accessing the privileged operation configuration information, the client 215, upon detecting the glove grasp (e.g. fingers closing), in a client privileged operation, instructs the glove to create a sense of touch as previously described herein.

State 13. In this example, first user 150 opens the door 110 with a left to right movement of the gloved hand. The master server 205 generates a series of hand position matrices (e.g., via the received tracking data from computing device 230 as previously described and at least partly in response to accessing the privileged operation configuration information, for example, with respect to State 10). A series of new arm position movements are determined and downloaded (e.g., via a synchronize commands/operations/instructions) from the master server 205 to the clients 215, 225.

State 14. Upon receipt by the client 215 of the hand tracking position data, a new position of the first user's hand and the door 110 is rendered (or caused to be rendered) in the first user's head mounted display 170. Upon receipt by the client 225 of the hand tracking position data, a new position of the first user's hand in Avatar1 and the door movement 110 is rendered in the second user's head mounted display 175. The position calculation sequence is repeated by the master server program 205 and rendering by the clients 215, 225 as the gloved hand of the first user opens the sliding door 110.

State 15. First user 150 releases the door handle, which in this example, is treated as a privileged client operation, and so is processed locally by the client 215. At least partly in response to accessing the privileged operation configuration information, the client 215 upon detecting the handle release via sensors in the glove (e.g., by detecting the opening of the user's hand), instructs the glove 160 to remove the pressure force (e.g., by deflating the collection of air pockets in glove 160.)

Optionally, the door handle release action is neither identified nor received in this example by the master server program 205, and consequently, the action is not rendered in the client 225. Optionally, the cluster system enables one or more clients 215, 225 to send/receive communications between each other. Optionally, client-to-client communication is enabled via the master server program 205. Optionally, client-to-client communication is enabled via user interface control(s) of the client and is not enabled via the master server program 205. Optionally, the handle release action of this example is communicated directly from the client 215 to the client 225 in a peer-to-peer communication (i.e., not via the master server program 205). Optionally, the receipt of the handle release action by the client 225 causes the avatar1's right hand as viewed by the second user 155 to be colored an unnatural skin color (e.g., green) via customized software of the clients 215, 225. Thus, as illustrated in this example, the cluster system facilitates/enables client communications and through these communications, customized software of the simulation can be developed/incorporated to provide certain simulation effects specific to one or a plurality of clients.

State 16. First user 150 walks through the door opening. The PPT motion tracking cameras 310-340 record the first user's 150 steps through the simulated door 110 via the infrared light emitted by the tracking markers affixed to the head mounted display 170. At least partly in response to accessing the privileged operation configuration information, the client 215 executing on the computing device 210 receives from the computing device 230 tracking data and performs certain calculations with respect to the infrared markers associated with the first user 150 to create a series of position matrices corresponding to the first user movement (e.g., as previously described with respect to, for example, State 7), and a new viewpoint is rendered (or caused to be rendered) by the client/display 215,170 for each new position/orientation matrix (e.g., via a local context privileged rendering operation as previously described herein). The image capture, processing, and client 215 rendering sequence is continually repeated as the first user 150 walks through the sliding door with the first user's head mounted display 170 displaying a view of the inside of Room 105.

State 17. As similarly described with respect to State 8, after each new first user position matrix is determined/calculated in State 16, the new position matrix is sent by the client 215 over the data network 250 to the master server program 205.

State 18. With respect to the master server program 205, the master server program 205 receives the generated position matrices corresponding to the first user from the client 215. For a given received position matrix from the client 215, the master server 200 creates, based at least in part on and taking into consideration the current position data (including head position and body location) of the second user 155, a new orientation/position of avatar1. This new avatar1 positioning data is downloaded (e.g., via a synchronize call/operation/instruction) from the master server program 205 to the second client 225 (and/or client computing device 220) for rendering in the head mounted display 175 of the second user 155 (see also State 9). As each synchronized update is received from the server 205, the associated avatar1 positioning in the scene is rendered by the client/display 225,175. The second user views in their head mounted display 175 avatar1 walking through the sliding door. In this example embodiment, at least a portion of the front part of the avatar's body is concealed by the wall as the first user enters the second room (Room 105).

State 19. When the master server program 205 determines that the first user 150 has cleared the door passage, the master server program 205 simulates the door 110 closing behind the first user. The master server program 205 determines the first user 150 has cleared the door passage based on the at least in part on the received position matrices from the client 215 or, optionally, by independently identifying first user 150 marker data from the tracking data output of the computing device 230. The master server program 200 downloads (e.g., via a synchronize call/operation/instruction) to the client 225 an update to the VR scene wherein the sliding door closes and/or provides the client with instructions to close the door in the VR scene. The client/display 225,175 renders (or causes the rendering) a view of the door closing scene(s) behind the avatar1 in the viewpoint of the second user's head mounted display 175.

Thus, as described above, an example clustered system provides a multi-user virtual reality simulation via a client/server architecture. Advantageously, the client/server architecture enables timely viewing of certain privileged user actions and server-based synchronization of non-privileged user actions to create a lifelike simulation experience. In addition, many of the technical details of rendering avatar representations of simulation participant in the viewpoint of each user is derived by the server and made available to the clients in a format compatible with the hardware used by each participant.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A cluster system comprising:
a master computing device;
a first computing device configured as a first client computing device, the first client computing device associated with a first user;
a second computing device configured as a second client computing device, the second client computing device associated with a second user;
a plurality of motion tracking cameras, wherein the plurality of motion tracking cameras are configured to reside in a physical space coincident with the first user, the plurality of motion tracking cameras configured to detect infrared light and to communicate position data derived from detected infrared light to the first computing device and to the master computing device;
a first marker, attachable to a head mounted display associated with the first user, the first marker configured to emit a first repetitive pattern of infrared light pulses, the first marker associated with one or more privileged operations that are to be performed locally by the first computing device;
a second marker, attachable to the head mounted display associated with the first user, the second marker configured to emit a second repetitive pattern of infrared light pulses distinct from the first repetitive pattern of infrared light pulses, the second marker associated with one or more privileged operations that are to be performed locally by the first computing device;
a third marker, wearable or holdable by the first user, the third marker configured to emit a third repetitive pattern of infrared light pulses distinct from the first repetitive pattern of infrared light pulses and distinct from the second repetitive pattern of infrared light pulses, wherein the third marker is associated with one or more non-privileged operations that are to be performed remotely by the master computing device;
non-transitory media that stores instructions readable by the cluster system, that when executed by the cluster system, cause the cluster system to:
access configuration information comprising information indicating what types of operations are privileged and what types of operations are non-privileged;
receive, at the first computing device from one or more of the plurality of motion tracking cameras, position data corresponding to the first marker and position data corresponding to the second marker;
at least partly in response to the receipt by the first computing device of the position data corresponding to the first marker and the position data corresponding to the second marker and on the accessed configuration information, determine that a privileged operation is to be performed by the first computing device and not by the master computing device, the privileged operation enabling an orientation of a first scene of a simulation to be rendered in the head mounted display associated with the first user in synchronization with movement of the head mounted display in at least five degrees of freedom;
transmit, from the first computing device to the master computing device, a position of the first user in the physical space, and
provide a first instruction by the master computing device enabling an image corresponding to the first user to be rendered at a first virtual position in a display device associated with the second user, wherein the first virtual position is based at least in part on the position of the first user in the physical space and on a viewpoint of the second user;
receive, at the master computing device from one or more of the plurality of motion tracking cameras, position data corresponding to the third marker; and
at least partly in response to receipt of the position data corresponding to the third marker and on the accessed configuration information, determine that a non-privileged operation is to be performed by the master computing device and not by the first computing device, wherein the non-privileged operation comprises enabling:
synchronized movement of a virtual representation of the third marker from a viewpoint of the first user corresponding to received position changes associated with the third marker to be rendered in the head mounted display associated with the first user, and
synchronized movement of a virtual representation of the third marker from a viewpoint of the second user corresponding to received position changes associated with the third marker to be rendered in the head mounted display associated with the second user.

2. The cluster system of claim 1, wherein the plurality of motion tracking cameras are configured to detect infrared light and to communicate position data derived from detected infrared light to the second computing device.

3. The cluster system of claim 1, wherein the third marker is attached to a limb of the first user.

4. The cluster system of claim 1, wherein the third marker is attached to or included as a component of a handheld tracking device.

5. The cluster system of claim 1, wherein the first repetitive pattern of infrared light pulses comprise light intensity state transitions.

6. The cluster system of claim 1, wherein the plurality of motion tracking cameras are configured to derive the identity of a marker from a detected repetitive pattern of infrared light pulses.

7. The cluster system of claim 1, wherein the cluster system is configured to enable, via a user interface of the master computing device, a third user to indicate what types of operations are privileged and what types of operations are non-privileged.

8. The cluster system of claim 1, wherein the virtual marker representation of the third marker comprises a virtual representation of a glove.

9. A cluster system, comprising:
a master computing device;
a plurality of motion tracking cameras, wherein the plurality of motion tracking cameras configured to reside in a physical space coincident with the first user, the plurality of motion tracking cameras configured to detect infrared light and to communicate position data derived from detected infrared light to the master computing device;

a marker, wearable or holdable by the first user, configured to emit a repetitive pattern of infrared light pulses, wherein the marker is associated with one or more non-privileged operations that are to be performed remotely by the master computing device;

non-transitory media storing instructions readable by the cluster system, that when executed by the cluster system, cause the cluster system to:

access configuration information comprising information indicating what types of operations are privileged and what types of operations are non-privileged;

receive at the master computing device, a position of the first user in the physical space, and provide a first instruction by the master computing device enabling an image corresponding to the first user to be rendered at a first virtual position in a display device associated with a second user, wherein the first virtual position is based at least in part on the position of the first user in the physical space and on a viewpoint of the second user;

receive, at the master computing device, from one or more of the plurality of motion tracking cameras, position data corresponding to the marker; and at least partly in response to the receipt of the position of the marker and on the accessed configuration information, determine that a non-privileged operation is to be performed by the master computing device and not by another computing device associated with the cluster system, wherein the non-privileged operation comprises enabling:

synchronized movement of a virtual representation of the marker from a viewpoint of the first user corresponding to received position changes associated with the marker to be rendered in the head mounted display associated with the first user, and synchronized movement of the virtual representation of the marker from a viewpoint of the second user corresponding to received position changes associated with the third marker to be rendered in the head mounted display associated with the second user.

10. The cluster system of claim 9, wherein the marker is configured to be attached to a limb of the first user.

11. The cluster system of claim 9, wherein the marker is attached to or included as a component of a handheld tracking device.

12. The cluster system of claim 9, wherein the first repetitive pattern of infrared light pulses comprise light intensity state transitions.

13. The cluster system of claim 9, wherein the plurality of motion tracking cameras are configured to derive the identity of a marker from a detected repetitive pattern of infrared light pulses.

14. The cluster system of claim 9, wherein the cluster system is configured to enable, via a third user interface of the master computing device, a user to indicate what types of operations are privileged and what types of operations are non-privileged.

15. A cluster system, comprising:

a first computing device configured as a first client computing device, the first client computing device associated with a first user;

a second computing device configured as a second client computing device, the second client computing device associated with a second user;

a plurality of motion tracking cameras, wherein the plurality of motion tracking cameras are configured to reside in a physical space coincident with the first user, the plurality of motion tracking cameras configured to detect infrared light and to communicate position data derived from detected infrared light to the first computing device;

a first marker, attachable to a head mounted display associated with the first user, the first marker configured to emit a first repetitive pattern of infrared light pulses, the first marker associated with one or more privileged operations that are to be performed locally by the first computing device;

a second marker, attachable to the head mounted display associated with the first user, the second marker configured to emit a second repetitive pattern of infrared light pulses distinct from the first repetitive pattern of infrared light pulses, the second marker associated with one or more privileged operations that are to be performed locally by the first computing device;

a third marker, wearable or holdable by the first user, the third marker configured to emit a third repetitive pattern of infrared light pulses distinct from the first repetitive pattern of infrared light pulses and distinct from the second repetitive pattern of infrared light pulses, wherein the third marker is associated with one or more non-privileged operations that are to be performed remotely by a computing device other than the first computing device;

non-transitory media that stores instructions readable by the cluster system, that when executed by the cluster system, cause the cluster system to:

access configuration information comprising information indicating what types of operations are privileged and what types of operations are non-privileged;

receive, at the first computing device from one or more of the plurality of motion tracking cameras, position data corresponding to the first marker and position data corresponding to the second marker;

at least partly in response to the receipt by the first computing device of the position data corresponding to the first marker and the position data corresponding to the second marker and on the accessed configuration information, determine that a privileged operation is to be performed locally by the first computing device and not by a computing device other than the first computing device, the privileged operation enabling an orientation of a first scene of a simulation to be rendered in the head mounted display associated with the first user in synchronization with movement of the head mounted display in at least five degrees of freedom;

transmit, from the first computing device to a master computing device, a position of the first user in the physical space;

receive, at the second computing device, a first instruction enabling:

an image corresponding to the first user to be rendered at a first virtual position in a display device associated with the second user, wherein first virtual position is based at least in part on the position of the first user in the physical space and on a viewpoint of the second user;

receive, at the first computing device, a first non-privileged instruction enabling:
  synchronized movement of a virtual representation of the third marker from a viewpoint of the first user corresponding to received position changes associated with the third marker to be rendered in the head mounted display associated with the first user; and
receive, at the second computing device, a second non-privileged instruction enabling:
  synchronized movement of a virtual representation of the third marker from a viewpoint of the second user corresponding to received position changes associated with the third marker to be rendered in the head mounted display associated with the second user.

16. The cluster system of claim 15, wherein the plurality of motion tracking cameras are configured to detect infrared light and to communicate position data derived from detected infrared light to the second computing device.

17. The cluster system of claim 15, wherein the plurality of motion tracking cameras are configured to detect infrared light and to communicate position data derived from detected infrared light to a computing device other than the first computing device or the second computing device.

18. The cluster system of claim 15, wherein the third marker is configured to be attached to a limb of the first user.

19. The cluster system of claim 15, wherein the third marker is attached to or included as a component of a handheld tracking device.

20. The cluster system of claim 15, wherein the at least five degrees of freedom comprise X-axis, Y-axis, Z-axis, yaw, and roll.

21. The cluster system of claim 15, wherein the first repetitive pattern of infrared light pulses comprise light intensity state transitions.

22. The cluster system of claim 15, wherein the plurality of motion tracking cameras are configured to derive the identity of a marker from a detected repetitive pattern of infrared light pulses.

* * * * *